United States Patent [19]
Parikh et al.

[11] Patent Number: 5,243,651
[45] Date of Patent: Sep. 7, 1993

[54] DIAGNOSTIC METHOD AND APPARATUS FOR A CABLE TELEVISION INTERDICTION SYSTEM

[75] Inventors: Himanshu Parikh, Lawrenceville; Vibhu Rustagi; Paul Borsetti, Jr., both of Duluth, all of Ga.

[73] Assignee: Scientific-Atlanta, Inc., Norcross, Ga.

[21] Appl. No.: 896,628

[22] Filed: Jun. 10, 1992

[51] Int. Cl.$^5$ .......................................... H04N 7/167
[52] U.S. Cl. ...................................... 380/20; 380/10; 380/7; 380/16
[58] Field of Search .......................... 380/10, 20, 7, 16

[56] References Cited

U.S. PATENT DOCUMENTS

| | | | |
|---|---|---|---|
| 4,912,760 | 3/1990 | West, Jr. et al. | 380/7 |
| 4,963,966 | 10/1990 | Harney et al. | 358/349 |
| 5,014,309 | 5/1991 | West, Jr. | 380/7 |
| 5,045,816 | 9/1991 | Bramhall et al. | 332/105 |

Primary Examiner—David Cain
Attorney, Agent, or Firm—William A. Marvin; Fredrick W. Powers, III

[57] ABSTRACT

A diagnostic method and apparatus for a cable television interdiction system is provided. One or more diagnostic modes each corresponding to a particular problem or state associated with the interdiction unit may be entered into by the interdiction unit. If a diagnostic mode is detected, the television signal provided to a television signal receiving apparatus, e.g., a television set, is disabled for a specified length of time. Thereafter, depending upon the diagnostic mode detected, either the television signal provided to the receiving apparatus and/or a light-emitting device, e.g., a light-emitting diode (LED), is pulsed a specified number of times corresponding to the detected diagnostic mode. The cycle of disabling the television signal provided to the receiving apparatus and pulsing either or both the television signal provided to the receiving apparatus and/or the LED is repeated until a transaction is received from the headend cancelling the diagnostic mode. Thus, the pulsing of the television signal provided to the receiving apparatus alerts the user of the receiving apparatus that a problem has occurred to the interdiction unit, and this information may be provided by the user to the cable television operator. Likewise, the pulsing LED coupled to the interdiction unit may alert a technician working on the interdiction unit as to the cause of the problem. In a preferred embodiment, the LED may be located on a tamper override module (TOM) inserted into the interdiction unit by a technician in order to service the interdiction unit.

41 Claims, 12 Drawing Sheets

DIAGNOSTIC METHOD AND APPARATUS FOR A CABLE TELEVISION INTERDICTION SYSTEM

BACKGROUND OF THE INVENTION

1. Technical Field

The present invention generally relates to a cable television (CATV) interdiction system and, more particularly, to a CATV interdiction system including an improved method and apparatus for diagnosing various types of problems in a remote interdiction unit.

2. Description of the Prior Art

The cable television industry has recently resorted to new technologies and has taken a second look at technologies developed in the early stages of development of cable television including negative and positive trap technology and interdiction systems to remove equipment off the subscriber's premises. A CATV interdiction system manufactured by Scientific-Atlanta, Inc., and described by U.S. Pat. No. 4,912,760, evidences one product manufacturer's response to such concerns. Precipitating the removal of equipment from the subscribers' premises has been the provision of television channel conversion equipment within the new television receivers sold today and the predominace of so-called cable ready receivers. In other words, the converter portions of converter/decoders are in many instances no longer required. Also, removal of equipment from the subscribers' premises accomplished a removal of equipment from the hands of pirates. The interdiction system described by U.S. Pat. No. 4,912,760 promotes the removal of all CATV equipment from a CATV service subscriber's premise except for equipment for certain special service applications such as pay per view services.

Most embodiments promoted by manufacturers of interdiction systems consist of a pole-mounted or side of building mounted enclosures located outside the subscriber's premises designed to serve four or more subscribers. This enclosure contains at least one microprocessor controlled oscillator and switch control electronics to secure several several television channels. Control is accomplished by injecting an interfering or jamming signal into unauthorized channels from this enclosure.

In the Scientific-Atlanta system to improve efficiency and to save costs, each of a plurality of oscillators may be used to jam several premium television channels in a continuous band of frequencies selected from the broadband 50-550 megahertz (MHz) or other spectrum. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

Cost reduction is achieved in the systems discussed above, i.e. trap and interdiction systems, by providing shared housings outside the subscriber's premises for each of a plurality of subscriber units, for example, four such units and common circuitry associated with the several subscriber units. Common control circuitry is shown in FIG. 2 of U.S. Pat. No. 4,912,760. These housings are mounted out-of-doors on poles or in pedestals for serving especially suburban subscribers. Further details of such housing apparatus is also provided by U.S. Pat. No. 4,963,966. Also, indoor housings are known from so-called multiple dwelling unit systems where a cable television system supplies service to apartment building or condominium complexes. In more suburban and rural environs, a single port (subscriber) unit may be provided which may, for example, be mounted to the side of an exterior of a subscriber's home.

Because of the nature of the interdiction units, various problems might occur in their operation—one or more components within the unit might fail, the connection with the headend might fail, power might be removed from the unit for one of several reasons, or persons may tamper with the unit. In the past, when such problems occurred, the subscriber's television service would be completely cut off or would be degraded or modified to a certain extent. For example, if the cover of the interdiction unit was opened by someone other than authorized personnel, circuitry within the unit would completely diable the unit, and service would be completely cut off to the subscriber(s). If the communication link or a component within the unit failed, subscriber television service would either be completely cut off or some other adverse effect on the television signal would likely occur.

Previously, when problems occurred in the operation of a subscriber's cable television service, the subscriber had to report the problem to the cable television operator, and a technician had to be dispatched to the subscriber's interdiction unit to determine the cause of the problem. Typically, the technician had no way of knowing the cause of the problem before physically examining the interdiction unit. The personnel at the headend usually had no way of determining the nature of the problem based upon the information provided by the subscriber. Therefore, the cable operator had no way of determining whether the problem could simply be fixed without sending a technician to the site, and the technician had no way of determining what types of tools might be necessary to fix the problem with the interdiction unit. As a result, the technician may need to make several trips to the sit of the interdiction unit in order to determine the problem and to obtain the proper tools to correct the problem, or the technician had to attempt to carry every conceivable tool which might be necessary to fix the problem with the interdiction unit.

SUMMARY OF THE INVENTION

It is therefore an object of the present invention to provide diagnostic modes for a remote interdiction unit in a television communication system to aid a technician in troubleshooting problems with the unit.

It is a further object of the present invention to provide diagnostic modes for a remote interdiction unit in a television communication system to allow a subscriber to identify the diagnostic mode invoked in the unit to a cable operator without actually knowing the particular problem.

It is a further object of the present invention to provide diagnostic modes for a remote interdiction unit in a television communication system in which a television signal provided to a television signal receiving apparatus is disabled and pulsed a specified number of times depending upon the particular diagnostic mode detected.

It is a further object of the present invention to provide diagnostic modes for a remote interdiction unit in a television communication system in which a light-emitting device coupled to the unit is pulsed a specified number of times depending upon the particular diagnostic mode detected.

It is a further object of the present invention to provide the following diagnostic modes, listed in order from highest priority to lowest priority: a tamper mode, a refresh timer timeout mode, a voltage controlled oscillator failure mode, and a home power count exceeded mode.

It is a further object of the present invention to provide a plurality of diagnostic modes for a remote interdiction unit in a television communication system in which the mode with the highest priority is detected.

In accordance with the present invention, a diagnostic method and apparatus for a cable television interdiction system is provided. One or more diagnostic modes each corresponding to a particular problem or state associated with the interdiction unit may be entered into by the interdiction unit. If a diagnostic mode is detected, the television signal provided to a television signal receiving apparatus, e.g., a television set, is disabled for a specified length of time. Thereafter, depending upon the diagnostic mode detected, either the television signal provided to the receiving apparatus and/or a light-emitting device, e.g., a light-emitting diode (LED) is pulsed a specified number of times corresponding to the detected diagnostic mode. The light-emitting device may form part of a multi-purpose device issued to technicians that can be coupled to the interdiction unit. The cycle of disabling the television signal provided to the receiving apparatus and pulsing either or both the television signal provided to the receiving apparatus and/or the light-emitting device is repeated until a transaction is received from the headend cancelling the diagnostic mode. Thus, the pulsing of the television signal provided to the receiving apparatus alerts the user of the receiving apparatus, that a problem has occurred to the interdiction unit, and this information may be provided by the user to the cable television operator. Likewise, the pulsing light-emitting device coupled to the interdiction unit may alert a technician working on the interdiction unit as to the cause of the problem. In a preferred embodiment, an LED may be located on a tamper override module (TOM) inserted into the interdiction unit by a technician in order to service the interdiction unit.

DETAILED DESCRIPTION OF THE INVENTION

A method and apparatus for broadband signal distribution according to the present invention will be discussed in the context of the off-premises cable television distribution apparatus disclosed in U.S. Pat. No. 4,912,760, the disclosure of which is herein incorporated by reference in respect to those features not described in the present specification. However, the present invention is not limited to interdiction cable television systems but is also applicable to other off-premises systems requiring periodic service and operational security. The technology may also be applied to on-premises systems and technologies, for example on-premises addressable converters and addressable descrambler converter technologies.

A detailed discussion of the interdiction system in which the present invention may be implemented is also provided in U.S. Pat. No. 4,963,966, also incorporated herein by reference. Furthermore, U.S. Pat. Nos. 5,109,286, 5,155,590, and 5,045,816, and U.S. patent application Ser. No. 625,901, entitled "CATV Pay Per View System Method and Apparatus," also incorporated herein by reference, disclose details of off-premises subscription television apparatus related by subject matter to the present invention. Topics relating to interdiction systems such as jamming signal frequency calibration, gain adjustment and jamming control oscillator will not be addressed herein in detail.

Figure 1:
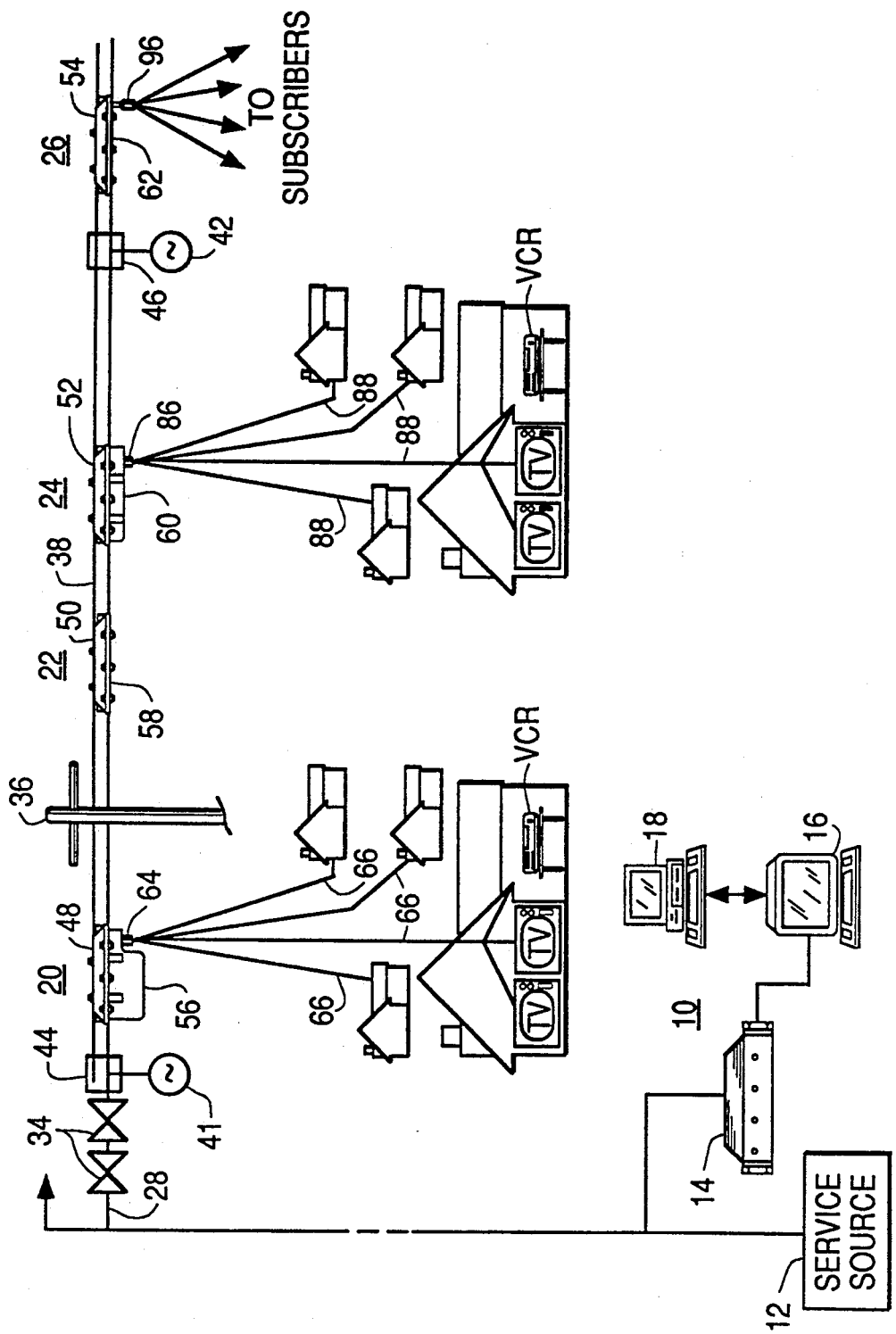
FIG. 1 illustrates a cable television distribution system including a plurality of signal distribution apparatuses.

FIG. 1 is a general block diagram of a subscription television system and, in particular, a cable television system. Subscription television system is intended herein to include any television service system such as over-the-air systems, satellite signal access systems and such television delivery systems. Cable television system as used herein refers to all systems involving the transmission of broadband signals over a transmission medium (fiber optic cable or coaxial cable) to remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber as used herein refers to either a private subscriber or a commercial user of the cable television system.

In the following detailed description of the drawings, similar reference characters are used throughout to denote similar elements. For example, tamper switch 237 is similarly shown in FIGS. 2 and 3.

Referring now to FIG. 1, headend 10 is a connecting point to a serving cable or trunk 28 for distributing, for example, television or other communication channels from service source 12 over feeder lines to drops 66, 88 and finally to subscriber locations. For reference purposes, an Electronic Industries Association (E.I.A.) standard cable television frequency allocation scheme is employed and referred to herein. Typically, in such systems, television channels of source(s) 12 are modulated and frequency division multiplexed together to comprise a broadband signal which may have a bandwidth in excess of one gigahertz. However, one may apply the principles of the present invention to other known standard or non-standard frequency allocations. Further, a National Television Subcommittee (N.T.S.C.) standard composite television signal at baseband is generally considered in the following description. However, the principles of the present invention apply equally to other standard and non-standard baseband standard definition and proposed high definition television signal formats. Also, the principles of the present invention are not limited to television services furnished from a headend but may include utility meter reading, burglar alarm reporting, digital or other stereophonic audio delivery systems, video or telephonic services and the like.

Headend 10 typically comprises a source of television programming 12. The television program source 12 may be a satellite television receiver output, a program produced by a television studio, program material received over a microwave or broadcast television link, a cable television link output, or any other source of television or other subscription programming consistent with the present invention. The program source material need not be limited to conventional television but may comprise teletext, videotext, program audio, utility data, or other forms of communication to be delivered to a remote location over the serving cable or trunk line 28 and subsequently over feeder lines and, then, drop lines 66, 88. Communications used to authorize or terminate services or different levels of service or to perform or monitor system functions are initiated via data entry to a computer system including a system manager computer 16 and a billing computer 18.

Conventionally, trunk line 28, feeder lines, and drop lines 66, 88 are constructed of coaxial cable. For higher performance, any one of these lines could be a fiber optic cable. Due to the cost of the installation and the need for a high quality initial transmission from headend 10, trunk line 28 is typically the only line constructed of fiber optic cable.

Program material provided by the service source 12 may be included within a regular service offering, or premium (requiring extra payment) or otherwise restricted or desirably secured from receipt at unauthorized receiver locations. It may be provided over any channel of the 50-550 MHz (or larger band) cable television spectrum. "Premium channel" or "premium programming" as used herein refers to a channel or program which is secured from unauthorized receipt either because of its premium or restricted status or because a regular service subscriber must incur an additional fee for reception.

Normally, all premium programming in cable television systems is scrambled. However, in accordance with interdiction system technology, premium programming is transmitted in the clear, and interdiction (service denial) is applied at an off-premises signal distribution apparatus (such as apparatus 20, referred to below for purposes of the present discussion) to jam reception of unauthorized premium programming. Off-premises signal distribution apparatus 20, 22, 24, and 26 may also form part of a reverse data transmission path as will be discussed in greater detail below. Off-premises signal distribution apparatus 20, 22, 24, and 26 respectively comprise housings or enclosures including casings 56, 58, 60, and 62 and covers 48, 50, 52, and 54.

It is likely that cable systems will gradually make the transition to an interdiction system, for example, as new subscribers are added. During a transition period, headend 10 may provide scrambled television programming as well as premium programming in the clear and a scrambler may be provided as long as converters/decoders remain in the system for unscrambling scrambled program transmission. For example, off-premises distribution apparatus 24 may be coupled to subscribers still having on-premises converters/decoders and off-premises unit 22 may be utilized to couple new subscribers to the system. In certain instances, converter/decoders at subscriber locations may later be entirely replaced by interdiction apparatus of the present invention. Descrambling or decoding equipment may also be provided at an off-premises housing.

Headend 10 includes an addressable data transmitter 14 for transmitting global commands and data downstream to all subscribers, group addressed communications to a particular group of subscribers, or specifically addressed communications for reception by a particular subscriber. Such forward data transmission may be conducted over a separate data carrier from the cable television spectrum, for example, at 108.2 MHz. Forward data transmission may also be over an unused default channel from the television spectrum. Global commands generally take the form of operation code and data while addressed communications further include the unique address of a particular subscriber.

A high speed data transmission format may be provided for communication between headend 10 and apparatus 56 via transmitter 14. One such format may be a biphase data encoding at a data rate of at least 12 to 14 kilobits per second and preferably 19.2 kilobits per second, frequency modulated on the 108.2 MHz data carrier (in the FM broadcast band). Frequency shift keying, period shift keying, or other related data transmission schemes may be used in the alternative. Principles surrounding appropriate data rate and format selection include meeting objectives of handling plural serial communications arrangements and maximizing data throughput. For example, the preferred addressable data transmitter queues communications for transmission and is capable of transmitting hundreds of communications per second.

In an alternative embodiment, forward data communications may take the form of in-band signals sent with a television channel superimposed, for example, upon an audio carrier during a special time period, for example, a period corresponding to the vertical blanking interval of the associated video signal. Such data communications further complicate data reception at interdiction apparatus and are desirably eliminated. However, in-band signaling may be required for the operation of certain converter/decoders known in the art.

Thus, communications, in particular, commands to authorize service to a particular subscriber, may be transmitted in-band or on a separate data carrier and typically involve transmitting a unique address of a particular subscriber unit or group of subscribers, a command or operation code and data. Decoders in the system receive the command, decode it, determine if the command is to be acted on, and if so perform the desired action such as provide a subscriber with pay-per-view credits or generally authorize services. Responsive to the control of the system manager computer 16, channel program or authorization data is transmitted via an addressable data transmitter 14 over a trunk line 28 to feeder lines with interspersed signal amplifiers 34 and power supply equipment 41, 42, 44, 46 provided as required. The serving signal is dropped via drops 66, 88 to a subscriber location at a pole 36 or from a pedestal at underground cable locations or in equipment closets.

Signal distribution apparatus 24 may be connected via connector 86 and drop 88 to a conventional converter/decoder which serves several functions. Responsive to an addressed communication from headend addressable data transmitter 14, channel or program authorization data is updated in an authorization memory if the address associated with the addressed communication matches a unique address of the subscriber decoder. For example, the subscriber address may comprise a plurality of bits over and above the actual number of subscribers in a system, the additional bits insuring the security of the address. The premium channel or program is then stored in the authorization memory of the converter/decoder. Television programming is normally converted to an otherwise unused channel such as channel 3 or 4 of the television spectrum by a converter portion of converter/decoder. Its premium status is checked against the data stored in authorization memory. If the programming is authorized, the decoder portion of the converter/decoder is enabled to decode authorized scrambled premium programming.

The provided television receiver (TV) may be a conventional television receiver or may be a cable ready television receiver. Because of the advent of cable ready television receivers, there is no longer a requirement at a subscriber premises for the converter portion of a converter/decoder because a converter is built into such television receivers. The television receivers may also comprise video cassette recorders (VCRs) or other recording devices which are likewise cable ready and adapted to receive a signal comprising a regular subscription service offering. A television receiver display may be adaptedly connected by the subscriber to receive over-the-air broadcasts, satellite repeated signals, and other alternative sources of signals such as taped programs via VCRs.

Subscriber premises shown at the end of the drops 66, 68 may comprise single family homes, multiple family dwellings such as apartment complexes, hotels, hospitals and the like, or commercial establishments such as restaurants, bars, theaters, factories and the like. The subscriber premises shown should not be narrowly construed to comprise only single family dwelling units shown.

In accordance with a cable television system provided with interdiction or other signal distribution apparatus, units 20, 22, 24, and 26 are mounted on a strand 38 supporting the cable to a pole 36, or provided via a pedestal, as is shown more particularly in U.S. Pat. No. 4,963,966. The units may also be mounted indoors in an equipment closet of a multiple dwelling unit or to the side of a subscriber's premises. Inside the units is common control circuitry for tapping into the broadband television and data transmission spectrum. Referring to the pole 36, there is shown a strand-mounted apparatus 56 serving four drops 66 to subscribers via connector 64. In practice, four or more subscribers and up to four or more drops 66 may be served by signal distribution apparatus 20. In addition to the common control circuitry, four or more plug-in subscriber modules may be provided for an off-premises housing. Also, according to the present invention, additional services requiring two way data transmission such as subscriber polling, home shopping, burglar alarm, energy management and pay-per-view services may be provided via four or more special service modules comprising reverse path signal combining circuitry of apparatus 56.

Desirably, all cable television equipment may be removed from the subscriber premises. However, for the provision of certain additional services, some on-premises equipment is unavoidable. For example, a subscriber transaction terminal apparatus may be provided in a subscriber's premises. The subscriber transaction terminal may simply comprise a subscriber-controlled data transmitter for transmitting data on the subscriber drop 66 in only one direction, namely, to signal distribution apparatus 20. For purposes of this description, the subscriber premises will be assumed to include at least one cable ready conventional television receiver, TV or VCR. Consequently, subscriber equipment need not comprise a tunable converter for converting a received cable television channel to an unused channel such as channel 3 or 4. The subscriber transaction terminal device comprises data entry or sensing means, data confirmation means, i.e., a display or alarm, if required, and a data transmitter coupled between the drop cable and the cable ready television receiver.

Power for signal distribution apparatus 20 may be provided over the cable from the headend direction via power supplies 41, 42 or be provided via the subscriber drop 66 or by a combination of such means. Foreseeably, power may be even provided by rechargeable means such as solar cells or other external or replaceable internal sources such as batteries. The subscriber transaction terminal equipment is preferably battery powered.

All signal distribution apparatus 20, 22, 24, and 26 include a tamper-resistant housing or otherwise secured enclosure as described by U.S. Pat. No. 4,963,966 or secured in a locked equipment closet of an apartment complex or both. If located in a place exposed to the elements, the housing should be water-tight. Also, the housing should be designed to preclude radio frequency leakage.

Signal distribution apparatus 20 is uniquely addressable by headend 10 just as is a known converter/decoder. If two bits of a plural bit unique subscriber address are associated with uniquely identifying one plug-in slot for one of four subscriber modules, common control circuitry may be uniquely addressed with remaining address data not used to secure the data communication. Of course, this concept may be utilized to address any number of subscriber modules associated with the signal distribution apparatus. Just as premium programming is transmitted in the clear and since no data communication is necessarily required with a subscriber premises, a subscriber address need not be transmitted in a secure form. Nevertheless, address security may be desirable so long as converter/decoders or other unique address requisite equipment is provided at a premises.

Signal distribution apparatus 20 comprises addressable common control circuitry, an optional plug-in special service module and up to four (or more) plug-in subscriber modules. Upon receipt of subscriber specific premium program, subscriber credit or channel authorization data, the data are stored at memory of common control circuitry of signal distribution apparatus 20.

Signal distribution apparatus 20 further comprises a diplexer for providing a forward transmission path which is coupled to automatic gain control circuitry of the common control circuitry. The common control circuitry forwards jamming frequency control data to a subscriber module. Channel interdiction circuitry associated with each subscriber module then selectively jams unauthorized premium programming dropped via a particular drop 66 to a particular subscriber. Consequently, signal distribution apparatus 20 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises signal distribution apparatus 20 or derive a signal from shielded and bonded cables which should likewise be maintained secure from radio frequency leakage.

Two way data transmission is provided via a so-called sub-split frequency spectrum comprising the band 5-30 MHz for upstream, reverse path transmission toward headend 10 and a spectrum from 54-550 MHz for downstream forward transmission. In particular, an amplitude shift keyed data transmission signal at approximately 5 MHz is used for communication on drop 66, while a binary phase shift keyed signal is used for upstream data transmission in the T8 band to headend 10. Distribution amplifiers 34 distributed along the distribution plant according to known prior art design techniques separate and separately amplify the two transmission bands. They are distributed along the transmission path in a manner so as to preclude the carrier-to-noise ratio of either transmission path from being too low.

Also, at a headend 10, there is located a radio frequency data receiver and data processor for receiving data transmissions from the off- or on-premises subscriber equipment. Details of this equipment are more particularly provided by U.S. Pat. No. 5,055,590 incorporated as necessary by reference.

Figure 2:
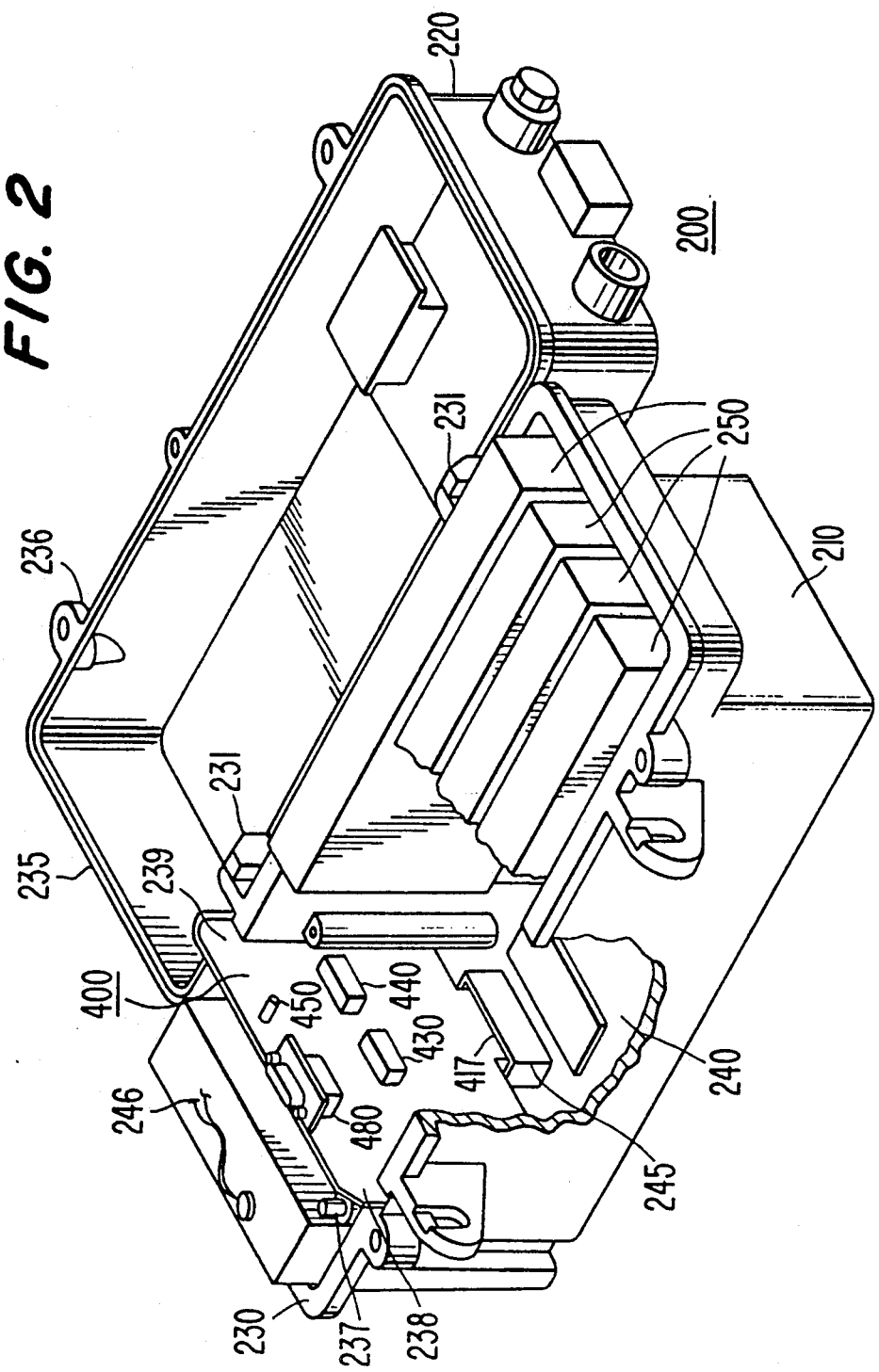
FIG. 2 is a cutaway view of a broadband signal distribution apparatus having an interface with a tamper override module coupled thereto.
Figure 3:
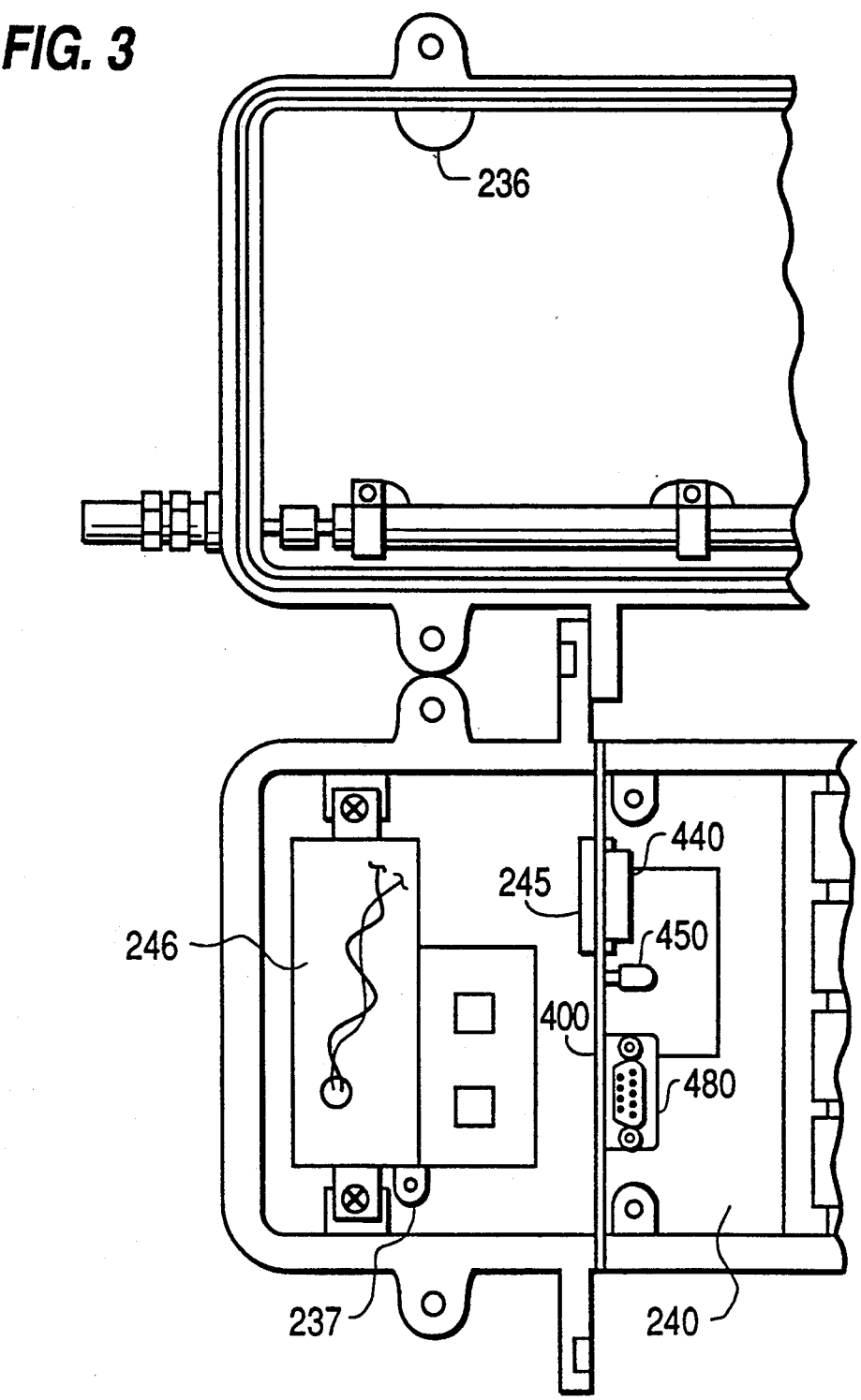
FIG. 3 is a view from above of a broadband signal distribution apparatus having an interface with a tamper override module coupled thereto.

With reference to FIGS. 2 and 3, the signal distribution apparatus 20 of the present invention will be described in further detail. While the method and apparatus according to the present invention will be described in the context of being located at the entry to a subscriber's premises, it will be appreciated that the present invention may be utilized anywhere along the signal path to a subscriber premises where a service pirate may obtain access to the distributed signals. The invention thus may be utilized not only in connection with apparatus 20 but apparatus 34, 44, 22, 24, 46, 26 and so on along the signal path via serving cable or drop to the entrance into the subscriber's premises.

The signal distribution apparatus 20 includes an enclosure 200 having a casing 210 and a cover 220. Cover 220 rotates about hinges 231 so as to protect enclosed circuitry within casing 210 from damage. Flange 230 and flange 235 extend around the periphery of casing 210 and cover 220, respectively. Further details of the enclosure can be found in U.S. Pat. No. 4,963,966 and will not be provided here.

The enclosure houses circuitry, for example, mother board 240, further described in connection with FIG. 5 below, individual subscriber modules 250, further described below in connection with FIG. 6, and power supply circuitry 246. Mother board 240 and individual subscriber modules 250 are further described below in connection with FIGS. 5 and 6. FIGS. 2 and 3 depict the enclosure with a tamper override module (TOM) 400 according to the present invention inserted into interface 245, which may be the same interface to motherboard 240 used for receiving a special service module (not shown).

The distribution apparatus 20 is equipped with a plunger 237 which cooperates with boss 256 such that when cover 220 is opened from casing 210 as shown, the plunger, which is conveniently spring mounted, will rise and so open (or close) a contact of an associated tamper detector (not shown). As depicted in FIGS. 2 and 3, the plunger 237 is attached to the power supply 246 and the boss 256 is attached to the cover 220. However, the invention is not limited in this respect. Plunger 237 and boss 256 may be positioned elsewhere within the enclosure 200 to realize the desired functional relationship as would be apparent to one of skill in the art.

If service is required and according to the present invention, a service person upon opening the cover 220 inserts TOM 400 (which in alternative embodiments may comprise a magnetic card, a punch card, or other equivalent device) into interface 245. Thereby, a controller may be satisfied that the entry into the casing 210 is authorized provided a code transmitted by the TOM 400 is accepted.

In a preferred embodiment, TOM 400 is equipped with ears 238, 239 which overlap a volume immediately above flange 230 after it is inserted into casing 210. In this manner, the service person, should he attempt to close the cover 220, will be precluded from closing the cover and so will be reminded to remove the TOM 400.

Figure 4:
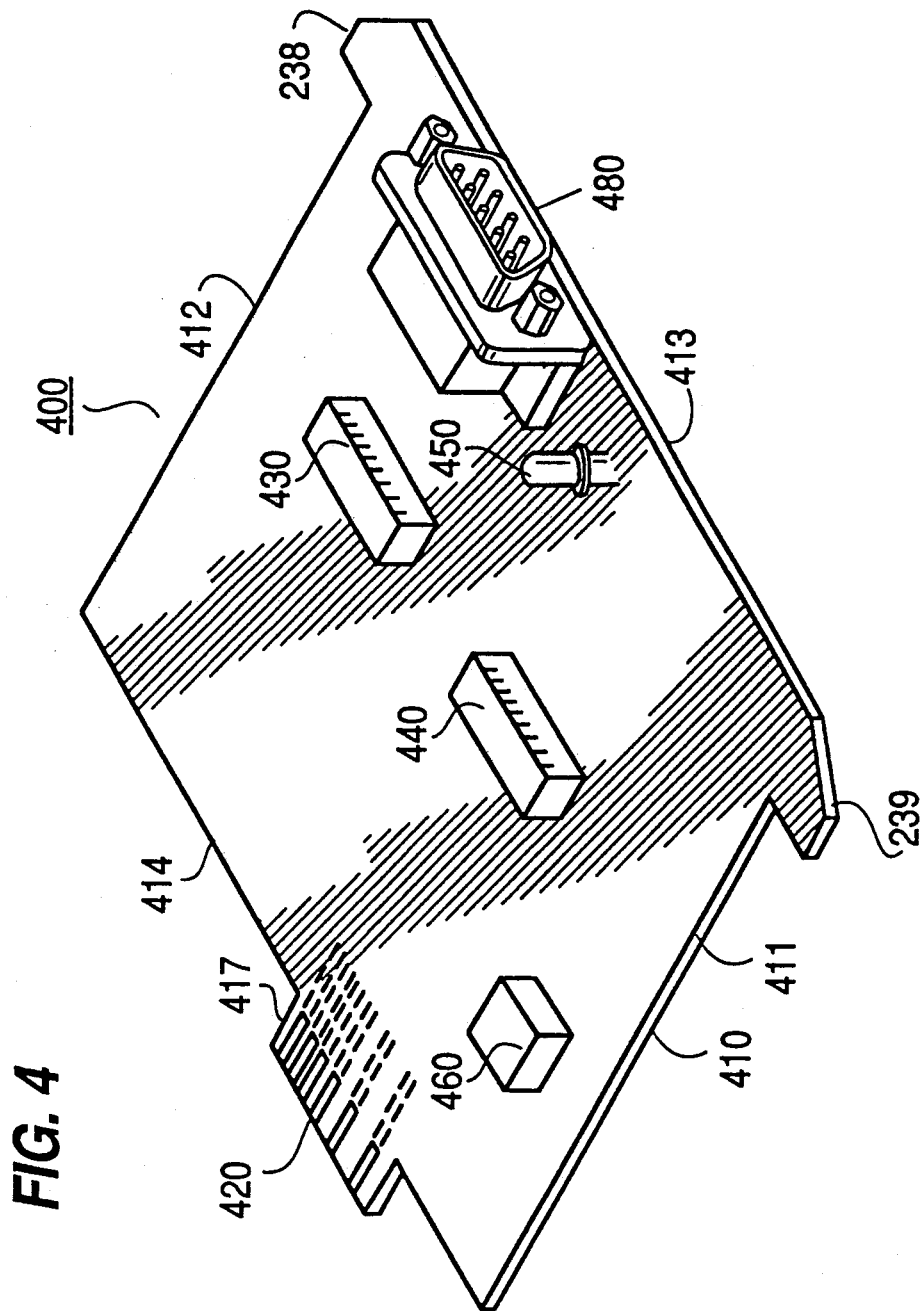
FIG. 4 illustrates a perspective view of a tamper override module.

According to one preferred embodiment, TOM 400 comprises a body portion capable of holding the circuit components described below in connection with FIG. 7. This preferred embodiment of TOM 400 is depicted in FIG. 4. Body portion 410 preferably comprises a card including first and second lateral sides 411, 412 and top and bottom portions 413, 414. The body portion 410 is preferably formed of circuit board material. However, the invention is not limited in this respect. As already suggested, the TOM may simply be a magnetic card such as a plastic credit card, a punched paper card or other equivalent structure sufficing as a key for coupling with a suitably provided interface 245.

Lateral sides of TOM 400 are spaced apart a distance equal to the width of enclosure 200 so as to snugly fit therein as shown in FIGS. 2 and 3. Ears 238, 239 extend from lateral sides 411 and 412, respectively. The ears 238, 239 are preferably trapezoidal as shown in FIG. 4 but may be any shape so as to preclude closure of cover 220. Ears 238, 239 extend over the flange 230 of enclosure 200 when the TOM 400 is inserted into the enclosure to thereby prevent the cover 220 from closing. Bottom portion 414 includes an extension 417 for insertion into interface 245 coupled to a controller of motherboard 240, for example, microprocessor 560 (FIG. 5). The extension 417 has an electrical connector comprising plural conductive leads 420 printed thereon for coupling with interface 245 to motherboard 240 of FIGS. 2 and 3. The conductive leads 420 extend on body portion 410 to the various circuit components, including converter 430, shift register 440, LED 450, and switch 460 as per FIG. 7. Top portion 413 includes interface 480 extending therefrom, for example, for facilitating communications with the motherboard by service personnel for diagnostic or other purposes or with the headend 10 or with subscriber terminal equipment.

The common control circuitry of signal distribution apparatus 20 will now be described with reference to the block diagram FIG. 5 for serving four subscriber modules in accordance with the block diagram FIG. 6 and a tamper override module according to FIG. 7. Referring particularly to FIG. 5, feeder cable 28 is shown entering off-premises interdiction apparatus 20 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 510 which may be in the form of a plug-in module taps into the broadband serving cable 28. A broadband of radio frequency signals is thus output to highpass filter 520 of diplex filter 595. Highpass filter 520 passes a downstream band of frequencies, for example, 54–550 MHz comprising at least the cable television spectrum and any separate data carrier frequency, such as 108.2 MHz, and blocks the upstream band of frequencies, for example, 5–30 MHz (in a bidirectional application). For an off-premises signal distribution system, the cable television spectrum may particularly comprise a narrower frequency band from about 54 MHz to 350 MHz.

Lowpass or bandpass filter 521 passes at least the 0–30 MHz spectrum and more particularly a pass band comprising the T8 band from approximately 14–18 MHz. One of twenty-three data channels may be selected for upstream data transmission from within the T8 band to avoid noisy regions of the spectrum.

Circuitry associated with broadband signal "seizure" from the distribution cable 28 may be conveniently mounted on a single board, conveniently named a seizure board of interdiction apparatus 20, more particularly described in FIG. 15 of U.S. Pat. No. 4,963,966, but described in general terms herein as at least comprising the directional coupler 510 and diplex filter 595 of FIG. 5.

Figure 5:
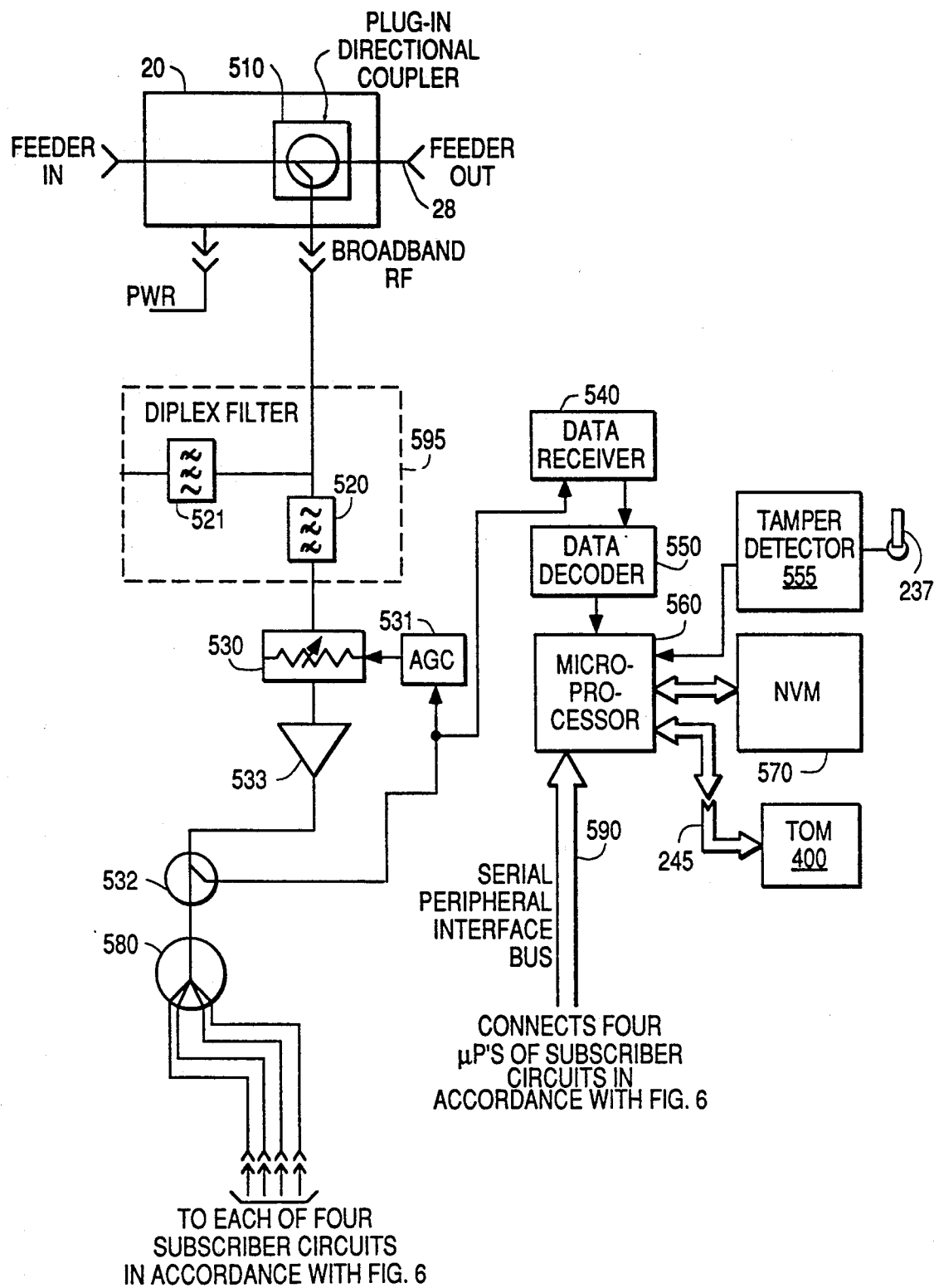
FIG. 5 is a block schematic diagram of an addressable common control circuit for a plurality of provided subscriber modules of a signal distribution apparatus including a broadband signal tap, a diplexer connected to the tap, a microprocessor coupled to a tamper override module, a tamper detector, a data receiver and decoder, and an automatic gain circuit.

A common automatic gain control circuit as disclosed in FIG. 5 comprises variable attenuator 530, RF amplifier 533, directional coupler 532, and AGC control circuit 531. This automatic gain control circuit appropriately regulates the broadband RF signal power to fall within established limits. The common circuitry of FIG. 5 is collocated or closely located to the subscriber modules which will be further described in connection with FIG. 6 and may be contained in the same housing with the special service units for each subscriber as described in U.S. patent application Ser. Nos. 07/618,745 and 07/625,901 filed Nov. 27, 1990.

Also connected to directional coupler 532 is a data receiver 540 for receiving downstream forward data transmissions from the addressable data transmitter 14 located at headend 10. Data receiver 540 receives data transmitted, for example, over a data carrier of 108.2 MHz and provides unprocessed data to data decoder 550. In accordance with an established protocol and as briefly described above, such data may be in the form of an operation code (command), a subscriber unique address and associated data. Data decoder 550 processes the data and provides the separately transmitted data to microprocessor 560 for further interpretation in accordance with a built-in algorithm. Microprocessor 560 is most efficiently chosen to alleviate as many responsibilities from any microprocessor provided for an individual subscriber module and so is most conveniently an eight bit microprocessor having eight kilobytes of internal code such as a Motorola 68HC05C8 or other suitable microprocessor having internal random access memory and program memory.

Received data may be stored in nonvolatile memory (NVM) 570 by microprocessor 560. NVM 570 is preferably three NMC93C46N (64×16) or one NMC93C66N (256×16) by National Semiconductor. However, the invention is not limited in this respect. NVM 570 may store an authorized access code received from the headend, enable/disable information for the tamper system, and/or a tamper detected flag. The tamper detected flag will be stored as a result of operation of tamper detector 555 which provides a contact closure or opening signal over a dedicated lead to microprocessor 560 as a result of the operation of plunger 237 as cover 220 (FIG. 2) is opened. Data may be stored in NVM 570 and jamming frequency control data downloaded when needed to a subscriber module according to FIG. 6 via a serial peripheral interface bus 590 connecting microprocessor 560 with separate microprocessors 600 associated with each provided subscriber module as shown in FIG. 6.

Furthermore, in an alternative embodiment, separate microprocessors 600 may be replaced by an application specific integrated circuit which performs functions under the control of microprocessor 560 as taught in U.S. application Ser. No. 07/896,292 entitled "Interdiction Method and Apparatus with Programmable Jamming Effectiveness". In a preferred embodiment, such an ASIC may comprise part number 463563/463/564 available from AMI/GOULD Semiconductor of Pocatello, Id. Microprocessor 560 is further coupled to interface 245 for communicating with TOM 400 or a special service module, if provided. Furthermore, microprocessor 560 may communicate, for example, upstream frequency and amplitude control data to microprocessors associated with each special service module, as described in application Ser. Nos. 07/618,745 and 07/625,901. The special service module may share interface 245 with the TOM 400 or, in an alternative embodiment, may be connected to a separate interface.

Variable attenuator 530 regulates the received broadband of picture carriers to a reference level while the microprocessor 560 controls the jamming carrier level outputs of associated subscriber units within the prescribed range. Microprocessor 560 consequently interprets both global communications addressed to common control circuitry or communications addressed to unique subscribers for operation of subscriber modules such as service credit, authorization commands, operation commands, or any combination thereof. If appropriate, microprocessor 560 ignores global, group addressed, or specifically addressed communications to other signal distribution apparatus or to conventional converter/decoders. An example of global communications peculiar to signal distribution apparatus 20 is premium channel frequency data for each premium channel or channel over which premium programming at a particular point in time is provided via headend 10. Examples of addressed communications to common control circuitry include communications comprising premium channel or programming authorization information, communications instructing the common control circuitry to provide credit to a particular subscriber, or communications changing the authorized access code of the signal distribution apparatus.

Serial peripheral interface buses 590, 245 may be two way communications links by way of which microprocessors 600 (FIG. 6) may, at least, provide status reports to microprocessor 560 upon inquiry or TOM (FIG. 7) may supply an access code or request status reports from microprocessor 560. Alternatively, a microprocessor of FIG. 6 may tap into a parallel contention-type bus 590 and bid for communication to either a microprocessor 560 of common equipment or another microprocessor 600 or may directly communicate with any of the other associated microprocessors over a separate serial bus 590. In a similar manner, both a special service module and a TOM may share a bus 245 and likewise bid for communication for access to microprocessor 560 or another microprocessor 600.

Figure 6:
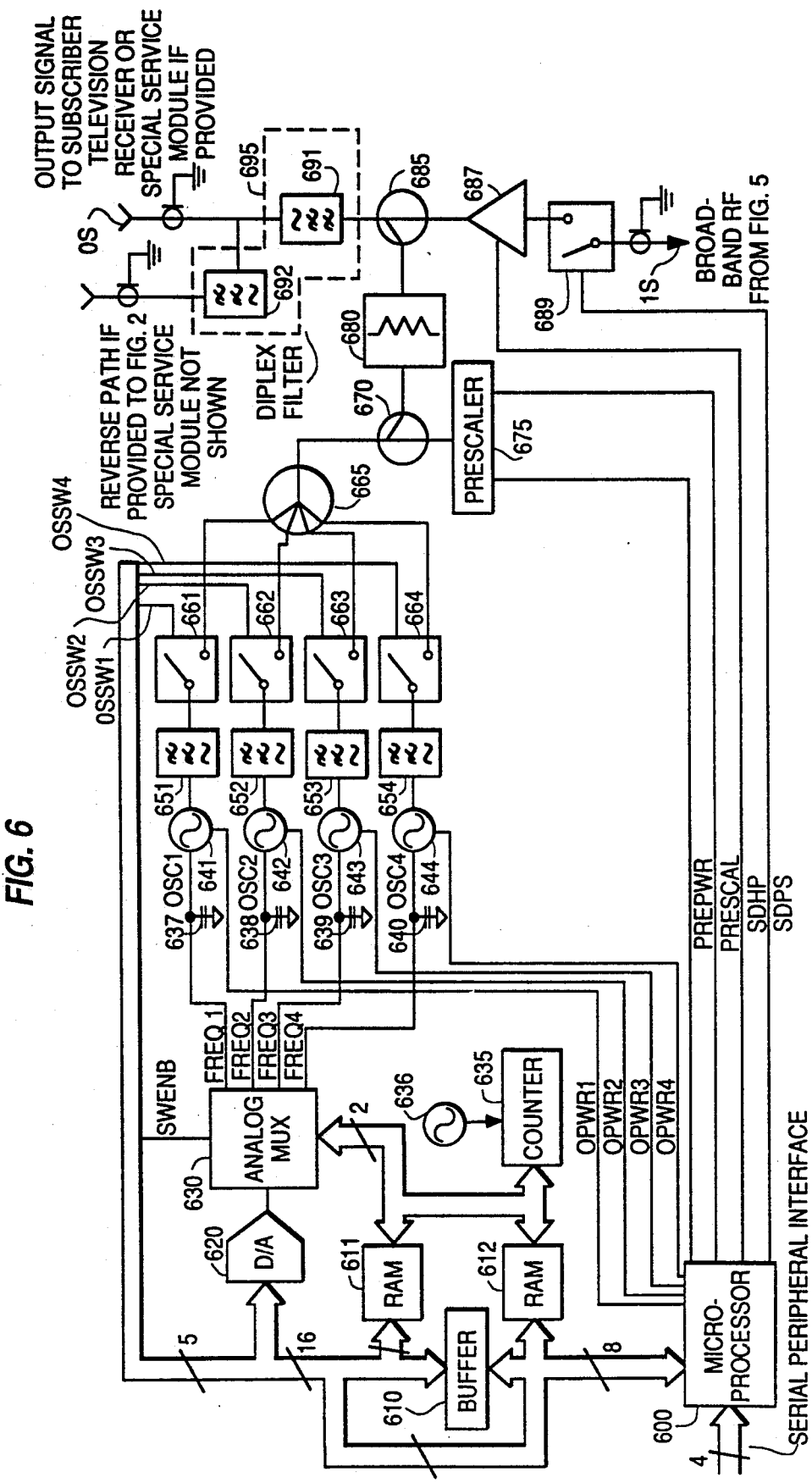
FIG. 6 is a block schematic diagram of one subscriber module of a signal distribution apparatus comprising a microprocessor for selectively controlling the jamming of unauthorized services to a subscriber, associated jamming equipment and a diplexer.

Radio frequency splitter 580 provides broadband radio frequency signals comprising a broadband cable television service spectrum separately to each subscriber module according to FIG. 6 that is provided.

FIG. 6 is an overall block schematic diagram of a subscriber module of signal distribution apparatus 20 including a diplex filter 695. A microprocessor 600 is associated with a particular subscriber module and communicates with microprocessor 560 of FIG. 5 over a serial peripheral interface bus. Microprocessor 600 may comprise an eight bit microprocessor equipped with only two kilobytes of code, this microprocessor being relieved of overall control responsibilities by microprocessor 560. Consequently, microprocessor 600 may conveniently comprise a Motorola 68HC05C3 microprocessor or similar unit. In the alternative embodiment including an application specific integrated circuit, microprocessor 560 may assume the control tasks of microprocessor 600 so that microprocessor 600 can be replaced. Furthermore, analog multiplexer (MUX) 630, D/A converter 620, RAMs, buffers, and prescalars 675 may all be replaced by the application specific integrated circuit.

A 5-30 megahertz or other lowpass band, more particularly, a 0-15 MHz lowpass band, may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 6 and withdrawn at terminal OS.

The broadband radio frequency television spectrum signal from FIG. 5 is provided to terminal IS. Referring to the path connecting terminal IS to terminal OS, there are connected in series a service denying switch 689, a radio frequency amplifier 687, a jamming signal combiner 685, and a high pass filter 691.

Service denying switch 689 is under control of microprocessor 600. In the event of an addressed communication from headend 10 indicating, for example, that a subscriber is to be denied service for non-payment of a bill, service denying switch 689 may be opened thereby disconnecting service. The switch 689 may be closed and opened during scheduled periods of authorized periodic service. In addition or in the alternative, a high frequency amplifier 687 may be powered down under control of microprocessor 600 whenever service is to be denied. Otherwise or even in addition, amplifier 687 may be set at discrete gain levels, under microprocessor control, to provide supplemental gain to the broadband television signal if a subscriber has a plurality of television receivers (TV's and VCR's) over and above a nominal amount. Amplifier 687 may comprise adjustable bandpass filter circuits under microprocessor control for selectably limiting service bandwidth to a subscriber.

Alternatively, all subscriber jamming signal generating equipment, for example signal generating equipment 641-644, may be replaced by a programmed bandpass filter 691 which under the control of the microprocessor selectably limits service bandwidth to a subscriber.

An appropriate control signal waveform output SDPS is provided by microprocessor 600 for controlling switch 689. Also the same ON/OFF control signal that is used to control the switch 689 may control the powering up and down of amplifier 687 as control signal SDHP. The status of the connect/disconnect condition of switch 689 is preserved in NVM 570 or other memory associated with microprocessor 560 or microprocessor 600. Furthermore, the intended state of switch 689 or related denial circuits is to be always closed or connected. However, the normal state of the condition of switch 689 of a periodic service subscriber is open or disconnected.

Continuing the discussion of FIG. 6, jamming signals are interdicted at directional combiner 685 under microprocessor control. Because of the directional characteristic of radio frequency amplifier 687, jamming signals cannot inadvertently reach the common control circuitry of FIG. 5 or the serving cable. Highpass filter 691 of diplex filter 695 prevents any return path signals from reaching combiner 685 and passes the broadband spectrum including any jamming signals toward terminal OS. Reverse path signals, for example, in this embodiment may be radio frequency signals below 30 megahertz. The broadband television spectrum is presumed to be in the 50-550 megahertz range. However, interdiction of premium channel viewing may be allocated anywhere desired within a broader or discontinuous cable television spectrum to be jammed. Consequently, filters 691 and 692 are designed in accordance with this or similarly selected design criteria to block or pass broadband television or reverse path signals as required.

Microprocessor 600, responsive to common microprocessor 560, controls the frequency and power level outputs of four (or five if necessary) voltage controlled oscillators 641-644, each of which oscillators jams premium channel frequencies within an allocated continuous range of frequencies. The frequency of the oscillators is set over leads FREQ1-4 in a manner described in U.S. Pat. No. 4,912,760. A power level and ON/OFF operation of the oscillators 641-644 are controlled over leads OPWR1-4.

Since premium programming may be transmitted anywhere in the cable television spectrum, the sum of all such allocated portions comprises the entire television spectrum to be jammed (even where non-premium channels are normally transmitted). Also, in accordance with the depicted interdiction system, the television spectrum to be jammed may comprise discontinuous portions or intentionally overlapping portions.

A further detailed discussion of frequency control and the interdiction system of FIGS. 1, 5, and 6 may be found in U.S. Pat. No. 5,014,309.

Figure 7:
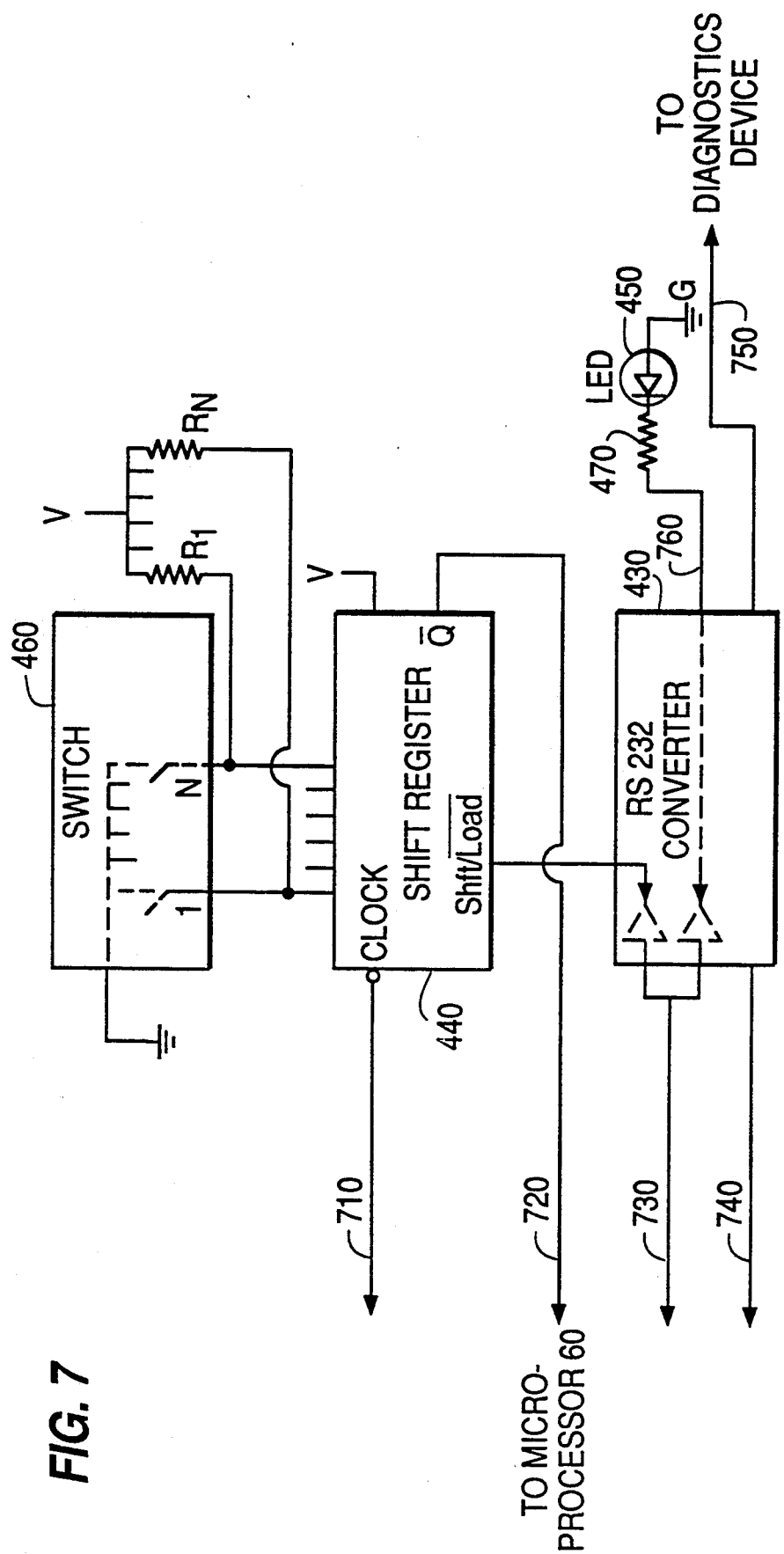
FIG. 7 is a schematic diagram of a tamper override module.

FIG. 7 is a block circuit diagram of the TOM 400. TOM 400 includes an N terminal switch 460 and a voltage source V. The voltage source V is connected via N lines having N resistors $R_1-R_N$ to switch 460. In one preferred embodiment, N may range from 2 to 8. Switch 460 is also connected to ground G. The N lines are additionally connected to N inputs of shift register 440. If the number of lines N is less than the number of input pins of the shift register, the remaining input pins are grounded. Switch 460 can be actuated to connect any of the N lines to ground G. Thus, each of the N lines supplies a voltage of either 0 or V to shift register 440 depending on whether the line is connected to ground G via switch 460.

Shift register 440 includes a clock pin and a output pin connected to the microprocessor 560 via lines 710 and 720, respectively. A voltage V is supplied to shift register 440 to supply power thereto. The shift/load pin is connected to converter 430, preferably an RS-232 converter. Line 730 connects microprocessor 560 to two separate pins of converter 430. The first pin receives the signal from line 730, inverts the signal, and outputs the inverted signal to the shift register. The second pin receives the signal from line 730, inverts the signal, and outputs the inverted signal via line 760. Line 740 additionally connects microprocessor 560 to converter 430. Together, lines 710, 720, 730, 740 comprise certain of the conductive leads 420 of extension 477 (FIG. 4). Line 750 connects the converter to, for example, a diagnostic or communications device (not shown) via interface 480 (FIG. 4). Line 760 connects converter 430 to a first terminal of indicator 450 (an LED as shown here) via resistor 470. A second terminal of indicator 450 is connected to ground G. Indicator 450 may be any device capable conveying information, for example a buzzer, a lamp, liquid crystal display, or the like.

The power for the TOM 400 is preferably supplied from the enclosure 200 through power conversion circuitry (not shown), for example, via certain of the conductive leads 420. Alternatively, TOM 400 may be powered by a battery or in another manner known to those of skill in the art.

Figure 8:
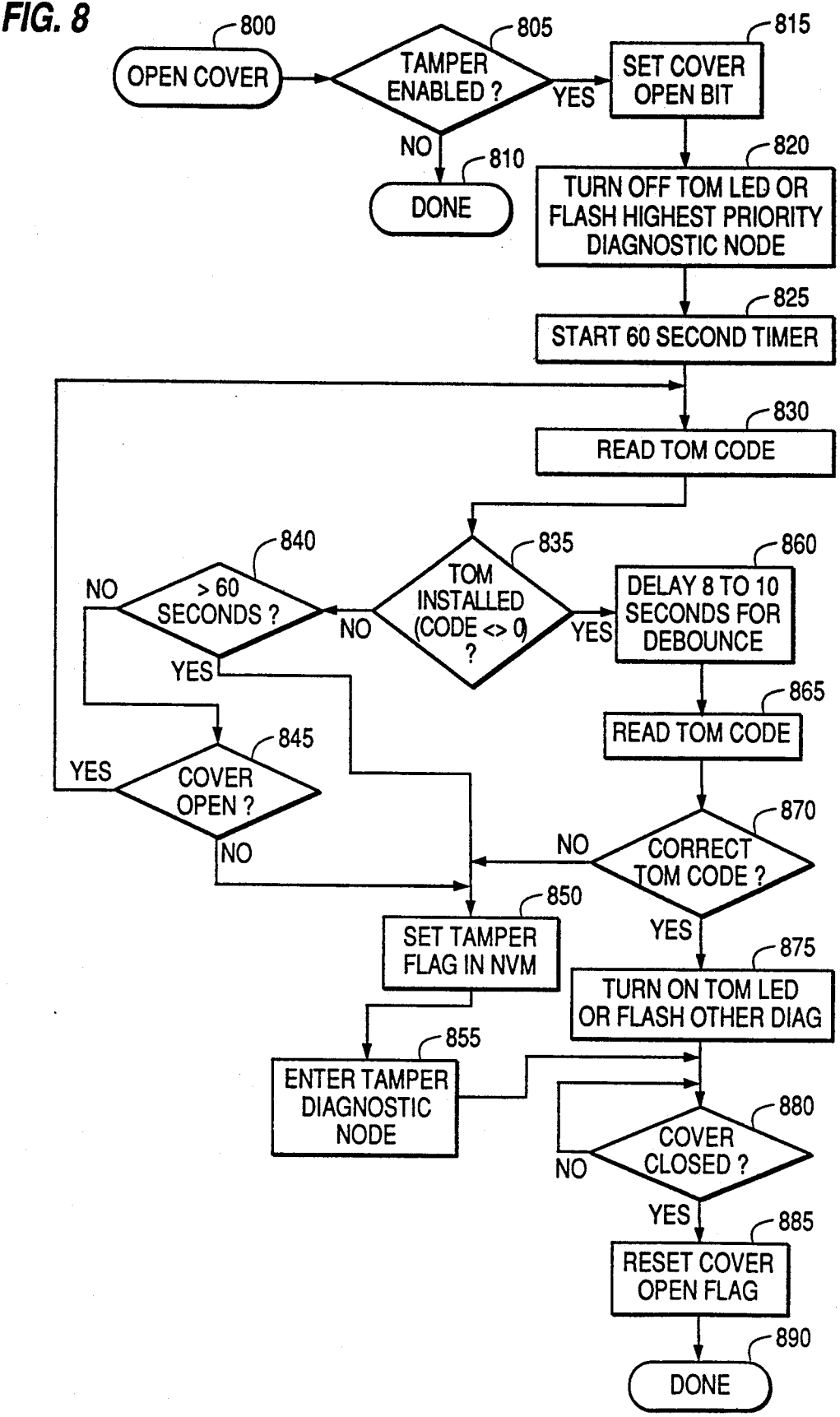
FIG. 8 is a flow diagram illustrating the operation of a distribution apparatus and a tamper override module when coupled to an interface of the distribution apparatus.

The preferred operation of the present invention is described in connection with the flow diagrams of FIGS. 8-11. FIG. 8 depicts a sequence of steps which are performed at step 905 shown in FIG. 9 (discussed below). First, referring to FIG. 8, when cover 220 of enclosure 200 is opened, tamper detector 555 signals microprocessor 560 at step 800. In response to the signal from tamper detector 555, microprocessor 560 determines if tamper mode is enabled from the enable/disable information stored in NVM 570 at step 805. If the tamper mode is disabled, further processes terminate at done box 810. If the tamper mode is enabled, microprocessor 560 sets a cover open bit flag in NVM 570 at step 815. Alternatively, tamper may be permanently enabled thereby obviating steps 805 and 810. Whenever tamper is enabled, it is assumed that the apparatus 20 has entered a tamper diagnostic mode of operation which is at a higher level of priority than any other diagnostic mode the apparatus may enter.

At step 820, initializing operations are performed. Depending on the diagnostic mode status of apparatus 20, the LED 450 is powered down if the only diagnostic mode in effect is a tamper diagnostic mode. However, if there is another diagnostic mode in effect other than a tamper diagnostic mode, which is the highest priority diagnostic mode, then, the LED 450 is signaled to flash in accordance with this diagnostic mode. The LED 450 is caused to flash at different rates depending on the diagnostic mode in effect. Other diagnostic modes besides a tamper diagnostic mode may include a refresh timer, a home power counter, an interdiction oscillator malfunction or other diagnostic mode at different levels of priority, the tamper mode being the highest of these levels. Features of apparatus 20 and operation and actuation of the several diagnostic modes are discussed in further detail below.

A timer internal of the microprocessor 560 is set to a predetermined time for timing a duration at step 825. The predetermined time is preferably about 60 seconds but may be shorter or longer depending on the typical delay a service person may experience in opening cover 420 and inserting TOM 400. However, the predetermined time may be adjusted by interaction with headend 10 via addressable data transmitter 15. The system operator thus may vary the time interval via addressable data command to controller 560 as experience of the servicemen warrants its variation. Another consideration is that one would not want the duration to be so long as to permit a service pirate to steal service without actuating the tamper diagnostic mode.

At step 830 a read TOM code sequence is initiated. That is, the microprocessor 260 outputs a signal set which causes the TOM 400 to output an access code which it then senses. Specifically, the microprocessor 560 outputs a signal on line 730 to the converter 430 to cause enablement of the load data function of shift register 440. In addition, microprocessor 560 clocks the shift register 440 via line 710 to load the data on its input lines. Next, the microprocessor 560 signals the shift register via line 730 and converter 430 to enable the shift function of the shift register. Successive clock pulses applied to the shift register via line 710 causes that data to be serially output on line 720. The microprocessor senses that signals on line 720 to determine if a TOM 400 is installed at step 835. In one embodiment, the read sequence may be repeated twice or even several times in order to ensure that the result is correct.

If a TOM 400 is not installed, the microprocessor 560 checks the timer to determine if the predetermined time (here, 60 seconds) has elapsed at step 840. If not, the microprocessor 560 determines if the enclosure cover is still open at step 845 by checking the status of the tamper detector 555. If the cover is still open, the process returns to step 830 and the TOM code is again read. If, at step 845, the cover is closed, the microprocessor sets a tamper detected flag in NVM at step 850 and the process proceeds to step 855 where the tamper diagnostic mode is entered. In a preferred embodiment, each subscriber module of the apparatus 20 goes immediately into a tamper diagnostic mode thereby interfering with the service provided to each subscriber connected to the apparatus 20. Interference with the service signal may be accomplished, for example, by control of the switch 689. Alternatively, amplifier 687, oscillators 641-644, or other system components may be controlled to interfere with the service provided to the subscribers. The interference may comprise a cutoff of the signal, the supply of a scrambled signal or a signal which is periodically scrambled, the supply of a pulsing signal, or a combination thereof.

If the microprocessor 560 determines that the predetermined time has elapsed at step 840, the tamper detected flag is set and the diagnostic mode is entered at steps 850 and 855. The sequence of steps 850 and 855 as well as the sequence of steps 820, 825 may be reversed without adversely affecting the general operation of the present invention.

If the microprocessor 560 determines that a TOM 400 is installed at step 835, further action is suspended for 8 to 10 seconds to allow for debounce at step 860. The TOM code is again read at step 865. The microprocessor 560 then compares the access code supplied by the TOM 400 to the authorized access code stored in NVM 570 at step 870. If the codes do not match, the process proceeds to steps 850 and 855 wherein the tamper detected flag is set and the diagnostic mode entered. If the access code supplied by the TOM 400 matches the authorized access code, the process moves to step 875 and the microprocessor 560 signals the converter 430 via line 730. Responsive to such signal, the converter 430 actuates the indicator 450 (here, the LED is illuminated) to indicate that the access code was correctly entered. If the apparatus is in a diagnostic mode other than a tamper mode, LED 450 is caused to continue flashing the LED at a rate consistent with that diagnostic mode. If, for example, the refresh timer diagnostic mode is in effect and the signal distribution apparatus is in such diagnostics mode, the microprocessor 560 signals the indicator 450 via line 730 and converter 430 to indicate such diagnostic mode.

After the diagnostic mode is entered at step 855 or after step 875, the microprocessor 560 waits for a signal from the tamper detector 555 indicating that the cover is closed. Thus according to the preferred embodiment, a TOM 400 can be removed to provide a service person with access to motherboard 240 below or for other maintenance. When the cover closed signal is received, the microprocessor 560 resets the cover open flag in NVM 570 at step 885 and the process is completed at done step 890.

In an alternative embodiment, it is suggested that the tamper detector 555 and tamper plunger 237 may be operated as a signaling mechanism in the absence of TOM 400. In this embodiment of apparatus 20, a predetermined code may be signaled as if plunger 237 were a pulsing device. Microprocessor 560 then may operate to determine a several digit code which must be input in accordance with predetermined criteria. For example, the code must be tapped into the apparatus 20 at a particular predetermined rate for each digit with a predetermined delay that must be exceeded between entry of each digit. If the code is accepted, the apparatus 20 may be satisfied an a tamper diagnostic mode avoided.

Alternative embodiments and operation of the tamper override capability are now discussed. For example, the tamper status flag may be re-enabled 60 seconds after TOM 400 is removed from interface 245 rather than after cover 220 is closed. Of course, re-enablement of the tamper status flag may be triggered in accordance with the occurrence of another event as will be apparent to one of skill in the art. In any of the above described embodiments involving a plunger 237, the plunger 237 may be provided with a cap or a cover to prevent accidental actuation by the service person whenever the service person is working on apparatus 20.

As previously explained, apparatus 20 of the present invention is able to operate in one or more diagnostic modes. Generally, diagnostic modes are modes that apparatus 20 may enter into based upon different circumstances or situations which may exist which affect the operation or the status of apparatus 20. For example, the tamper diagnostic mode entered into at step 855 of FIG. 8 comprises one diagnostic mode under which apparatus 20 may operate. Other diagnostic modes which may be utilized according to the present invention include modes corresponding to (1) the unsuccessful transmission of commands or transactions from transmitter 14 to apparatus 20 (FIG. 1); (2) the repeated removal of power to apparatus 20; (3) the malfunction of an interdiction oscillator in a subscriber module (FIG. 6). In a preferred embodiment, four diagnostic modes are utilized, although one of ordinary skill in the art will readily recognize that other diagnostic modes, corresponding to other modes for apparatus 20, may just as easily be incorporated into the present invention.

Figure 9:
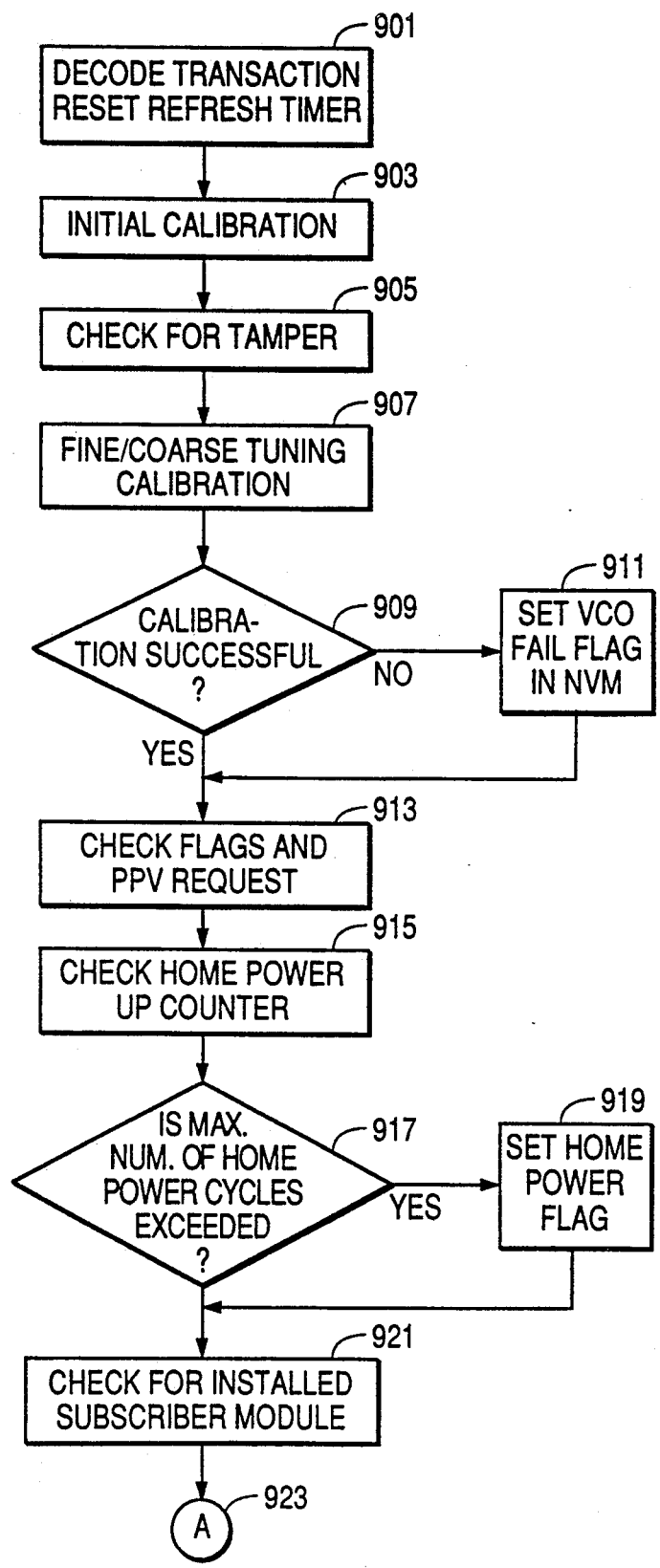
FIG. 9 is a flow diagram depicting an initial series of steps performed by the addressable common control circuit of FIG. 5 and the subscriber module of FIG. 6 according to a preferred embodiment of the present invention.
Figure 10:
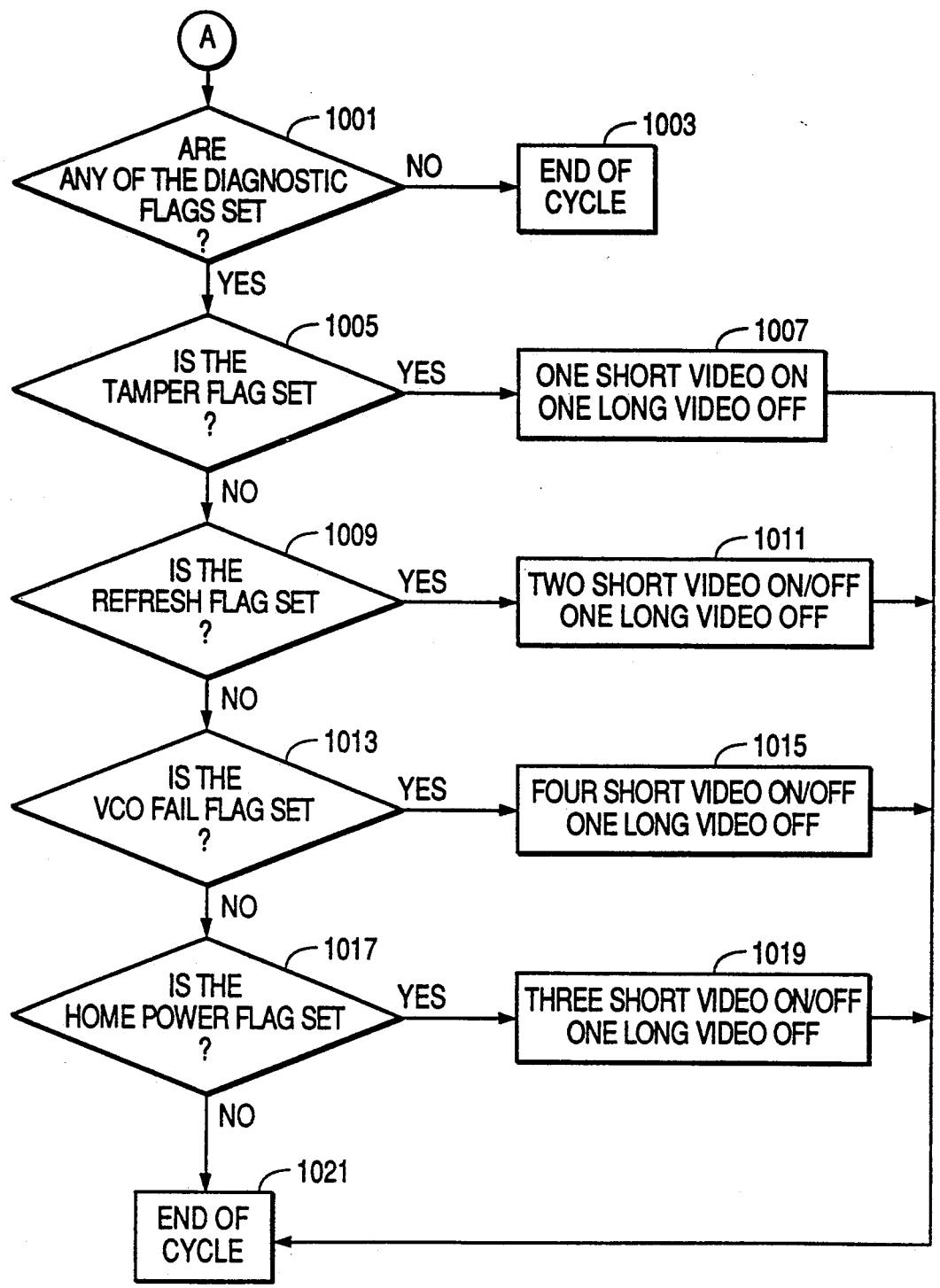
FIG. 10 is a flow diagram depicting a series of steps performed after the steps of FIG. 9 by the addressable common control circuit of FIG. 5 and the subscriber module of FIG. 6 according to a preferred embodiment of the present invention.
Figure 11:
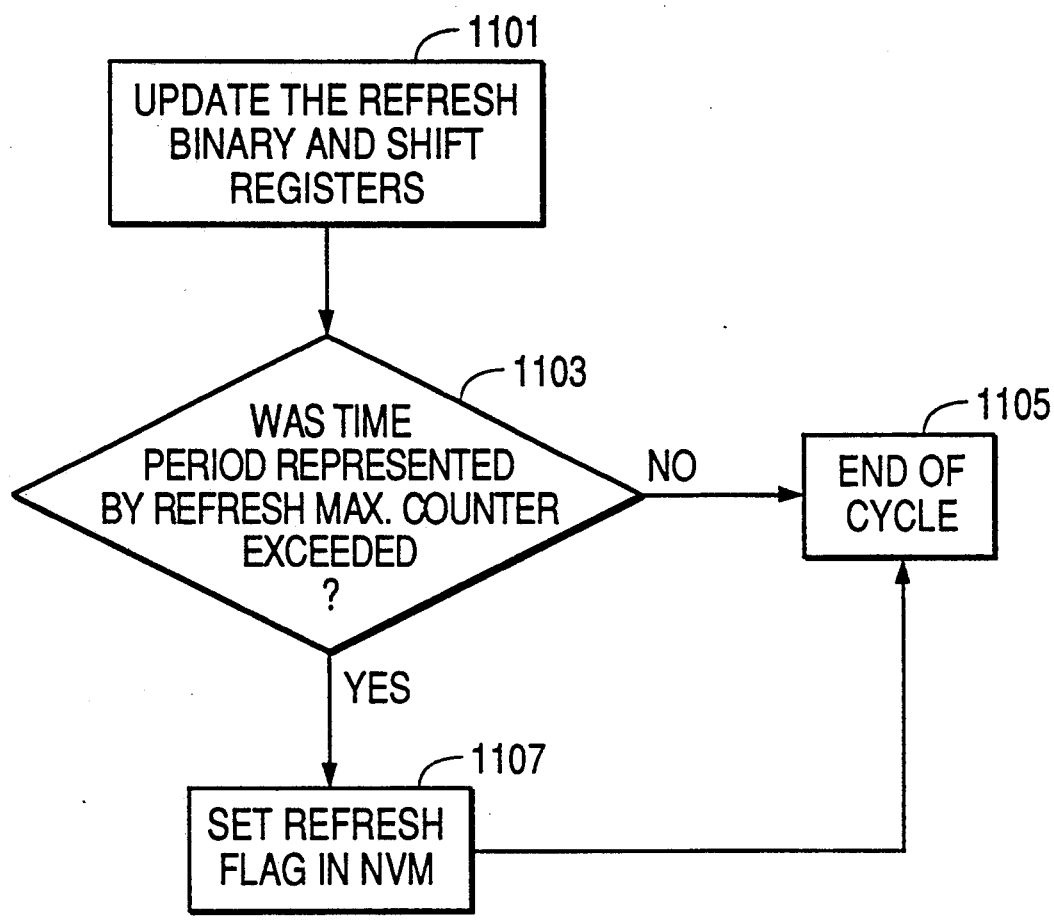
FIG. 11 is a flow diagram depicting a series of steps performed by the addressable common circuit of FIG. 5.

In FIGS. 9-11, a flow diagram is depicted which illustrates the operation of the addressable common control circuit of FIG. 5 and each subscriber module of FIG. 6. As will be described below, the steps shown in FIG. 9 operate in conjunction with the steps shown in FIG. 8 to implement the detection of one or more diagnostic modes of apparatus 20. Thereafter, the steps depicted in FIG. 10 are executed in order to implement the communication to the outside world that a diagnostic mode has been entered. More details concerning the interaction of the steps of FIG. 8-11 will be described below.

Referring to FIG. 9 in conjunction with FIG. 5, at step 901 the microprocessor 560 receives a transaction transmitted from transmitter 14 by apparatus 20 at data receiver 240 and decoded by data decoder 250. Such a transaction may consist of any type of operand, address and/or data which is addressably or globally transmitted to one or more interdiction apparatuses 20 so as to instruct the apparatus(es) 20 to perform one or more of a wide variety of functions. For example, such a transaction may consist of an instruction for the interdiction unit to jam a certain frequency, update the time of day stored within the interdiction unit, etc. The operation of the components of FIG. 5 in processing a transmitted transaction were discussed in more detail previously.

According to the present invention, when a transaction is received and decoded by apparatus 20, a "refresh timer" is also reset. In a preferred embodiment, the refresh timer is represented by binary and shift registers in NVM 570 and are continually incremented in real time by microprocessor 560. In addition to the refresh timer, a refresh timer max value is also stored in NVM 570 and represents the maximum amount of time that the interdiction unit may operate without receiving any addressed transactions. If the apparatus 20 does not receive any addressed transactions within the time represented by the refresh timer max value, then all of the subscriber modules controlled by the particular interdiction unit are forced in the refresh diagnostics mode. In a preferred embodiment, only an "authorization" transaction transmitted from the transmitter 14 to the interdiction unit apparatus 20 can bring the unit out of this diagnostic mode. This mode will be explained in further detail below.

FIG. 11 shows a sequence of steps which are performed by microprocessor 560 leading up to the refresh diagnostics mode. At step 1101, the binary and shift registers stored in NVM 570 and representing the refresh timer are updated, by, for example, an incrementing operation. At step 1103, a comparison is made between the refresh timer stored in NVM 470 and the refresh timer max value, also stored in NVM 570. If the refresh timer does not exceed the refresh timer max value, then the cycle depicted in FIG. 11 is ended at step 1105. However, if the refresh timer exceeds the refresh timer max value, then a refresh diagnostic flag is set in NVM 570 at step 1107 to indicate that the refresh diagnostic mode should be entered. Thereafter, the cycle of FIG. 11 is ended at step 1105. The actual handling of the refresh diagnostic mode, like the other diagnostic modes of the present invention, is described with respect to FIG. 10 below.

Because the apparatus 20 will enter a refresh diagnostic mode whenever the refresh timer exceeds the refresh timer max value, any transaction addressed to the apparatus 20 must reset the refresh binary and shift registers. Thus, as long as transactions are continually received before the refresh timer reaches the refresh timer max value, the interdiction unit will not go into the refresh diagnostic mode. Hence, an underlying purpose of the refresh diagnostic mode is to indicate that a problem exists with the transmission line between the transmitter 14 and the apparatus. Of course, in order for this mechanism to work properly, transactions must be addressed to each apparatus 20 with a period less than that represented by the refresh timer max value. Thus, in a preferred embodiment, the refresh max value may be set by a transaction sent from transmitter 14, or otherwise, to a value which represents a time period greater than the period between the transmission of transactions to each apparatus 20.

After the transmitted transaction is decoded and the refresh timer is reset at step 901, an initial calibration step may be perfomed from by the microprocessor 560 at step 903. Typically, initial recalibration occurs on power up or reset. Thus, it is not necessary to perform the initial calibration step for every transaction, and step 903 may be bypassed. Generally, the calibration step of step 903 (and the calibration step of step 907) are performed by microprocessor 600 responsive to microprocessor 560 in order to calibrate the voltage controlled oscillators (VCOs) 641-644 of each subscriber module. In a preferred embodiment the calibration steps 903 and 907 are performed in a manner described in U.S. Pat. No. 4,912,760. Furthermore, recalibration steps 907 may be performed at regular time intervals. These periodic recalibration operations are most likely to detect VCO failure.

Between steps 903 and 907, step 905 is performed. In step 905 the microprocessor 560 checks for the occurrence of a tamper condition by performing the steps shown in FIG. 8. That is, the various steps of FIG. 8 are executed only when the microprocessor 560 reaches step 905 of FIG. 9. As explained before, if the tamper diagnostic mode is to be entered, then step 855 in FIG. 8 is encountered. In actuality, step 855 shown in FIG. 8, while executed in the logical sequence as shown in that figure, is actually handled by microprocessor 560 and microprocessor 600 as depicted in FIG. 10. This figure will be discussed in detail below.

After steps 901, 903, 905 and 907 are performed by microprocessors 560 and 600, step 909 is encountered. At step 909, microprocessor 560 determines whether the calibration of steps f03 and 907 was successful. If the calibration operation was not successful for a particular VCO, and a "disconnect on failure" flag is set in NVM 570, then a VCO fail flag is set in NVM 570 corresponding to the subscriber module which failed. The disconnect on failure flag is set by an interdiction parameter transaction which is transmitted from transmitter 14 to apparatus 20. If the disconnect on failure flag is not set, then the VCO fail flag will not be set regardless of whether the calibration step is successful for the VCO.

An authorization transaction transmitted to the interdiction unit apparatus 20 will clear the VCO fail flag once it is set, unless the next calibration sequence again fails to create the frequency. The VCO fail flag is utilized by the microprocessors as shown in FIG. 10 in order to implement the proper diagnostic modes, and will be discussed further below.

If a VCO fails to consistently calibrate, the VCO failure diagnostic mode will keep occurring. This indicates that there is probably a hardware failure that needs to be checked. In one embodiment, in case a technician is unavailable to check, the system manager may send an interdiction transaction to the interdiction unit 20 which clears the "disconnect on failure" flag. If a frequency calibration of the VCO fails in this case, the channel corresponding to the frequency will be left in the clear (e.g., not jammed).

At step 913, various flags and the pay-per-view (PPV) requests are checked. More detailed information about this step may be found in U.S. Pat. Nos. 5,109,286, 5,155,590, and 5,045,816 and U.S.Pat. application Ser. No. 625,901, entitled "CATV Pay Per View System Method and Apparatus".

At step 915, the "home power up counter" is checked. The home power up counter comprises binary and shift registers maintained in NVM 570 which keep track of the number of times the motherboard (FIG. 5) is powered up. The headend 10 transmits to apparatus 20 via transmitter 14, as part of a security parameters transaction, the maxiumum number of power up cycles which are allowed. The maximum number of power up cycles is also stored in NVM 570.

The purpose behind the maintenance of the number of power up cycles is to prevent a subscriber from inhibiting the downgrade of service by removing and restoring power to the apparatus 20 in a cyclic fashion. Ordinarily, the interdiction unit apparatus 20 might transmit normally jammed signals in the clear when it is first powered up and before the jamming effects can begin. Therefore, if a subscriber continually removes and restores power to apparatus 20, he or she could effectively receive a normally jammed signal in the clear.

In order to prevent this situation from occurring, the home power up counter stored in NVM 570 and incremented during each power up is checked at step 905 by microprocessor 600 under control of microprocessor 560. Thereafter, at step 917, microprocessor 600 compares the home power up counter with the maximum allowable power up count, also stored in NVM 570, and if the maximum value is exceeded by a particular subscriber, a home power count exceeded flag is set in step 919 corresponding to the particular subscriber module. The home power count exceeded flags are thereafter used by the sequence shown in FIG. 10 to implement the home power diagnostic mode of the present inventions, much the same as other diagnostic mode flags are used to implement other diagnostic modes. An authorization transaction may be sent by the transmitter 14 to apparatus 20 to clear the home power count exceeded flags (as well as the other diagnostic mode flags), and thus to restore the particular subscriber's service. Any addressed transaction will reset the home power binary and shift register counters in NVM 570.

The home power count exceeded diagnostic mode is presumably only needed if each subscriber module (FIG. 6) is powered off a subscriber-controlled line. If power to operate a subscriber module is derived from the cable transmission line or other source not controllable by a user, then this diagnostic mode is probably not necessary, although it may still be implemented in this case.

At step 921, microprocessor 560 checks for installed subscriber modules. Generally, this step is performed in order to determine which subscriber modules are present so as to control the modules accordingly. A detailed explanation of the various steps involved in this process is included in U.S. patent application Ser. Nos. 07/618,745 and 07/625,901 filed Nov. 27, 1990, which are incorporated herein by reference. Step 923 merely indicates that the process continues with the steps shown in FIG. 10.

FIG. 10 depicts the steps which are executed in order to handle the various diagnostic modes of the present invention. Up until the point that the steps of FIG. 10 are encountered, the various diagnostic mode flags are selectively set based upon the particular diagnostic mode to enter, if any. For example, in FIG. 8, if the tamper diagnostic mode is to be entered, then the tamper flag in NVM 570 is set at step 850 (in this case, step 855 of FIG. 8 is handled by the steps of FIG. 10, as discussed below). Likewise, if the calibration of a VCO 641-644 for a particular subscriber module is not successful, the VCO fail diagnostic flag within NVM 570 for the subscriber module is set at step 911 (FIG. 9). If the maximum number of home power up cycles is exceeded for a subscriber, the appropriate home power count exceeded diagnostic flag is set at step 919. Finally, if apparatus 20 does not receive a transaction from transmitter 14 within the time period set by the refresh max counter in NVM 570, then the refresh diagnostic flag is set at step 1107 (FIG. 11). Of course, the four diagnostic modes described are merely a preferred embodiment of the present invention. Additional diagnostic modes, each having its own diagnostic flag, may be implemented which correspond to other events or states which apparatus 20 or other components of the present invention may encounter.

Referring to FIG. 10, step 1001 is first performed by microprocessor 560 and/or microprocessor 600 in order to determine whether any of the diagnostic flags in NVM 570 are set. If none of these flags are set, then the cycle ends at step 1003.

If, however, one or more of the flags are set, then step 1005 is encountered. Specifically, at step 1005, microprocessor 560 determines if the tamper flag is set in NVM 570. If the tamper diagnostic flag is set, then microprocessor 560 performs step 1007. If the tamper flag is not set, microprocessor 560 next executes step 1009, and determines if the refresh diagnostic flag in NVM 570 is set. If the refresh diagnostic flag is set, microprocessor 560 performs step 1011. Otherwise, microprocessor 560 next executes step 1013.

At step 1013, microprocessor 560 determines whether the VCO fail flag is set for any of the VCOs in any of the subscriber modules. If a VCO fail flag is set, then microprocessor 560 and microprocessor 600 execute step 1015. Otherwise, microprocessor 560 executes 1017. At step 1017, microprocessor 560 determines if the home power count exceeded flag is set for any of the subscriber modules. If such a flag is set, then microprocessor 560 controls microprocessor 600 to execute step 1019. Finally, after any of steps 1007, 1011, 1015, or 1019 are executed, microprocessor 560 reaches the end of the flow cycle at step 1021, and the cycle represented by FIGS. 8-11 is repeated, as discussed above.

Referring to steps 1007, 1011, 1015 and 1019, the diagnostic modes of the present invention will now be described. Particularly, step 1007 represents the tamper diagnostic mode, step 1011 represents the refresh counter diagnostic mode, step 1015 represents the home power count exceeded diagnostic mode, and step 1019 represents the VCO failure diagnostic mode. The four diagnostic modes discussed are merely disclosed as a preferred embodiment of the present invention which addresses some of the most common diagnostic situations which apparatus 20 may encounter. Of course, additional diagnostic modes may be easily implemented while staying within the scope of the present invention.

According to a preferred embodiment of the present invention, the particular diagnostic modes under which the interdiction unit may operate are conveyed to either a user of the communication system (e.g., the cable television system), a service technician, or some other person similarly situated. In one embodiment, when the present invention is implemented within the television signal distribution environment, the video signal may be turned off for a relatively long period of time, after which a series of video pulses (or "blips") during which the television signal is transmit without interruption (e.g., in the "clear") are provided to the end user. This cycle is then repeated. The number of video pulses which are provided between the relatively long period of time is designed to correspond to the particular diagnostic mode under which the interdiction unit is operating.

Figure 12:
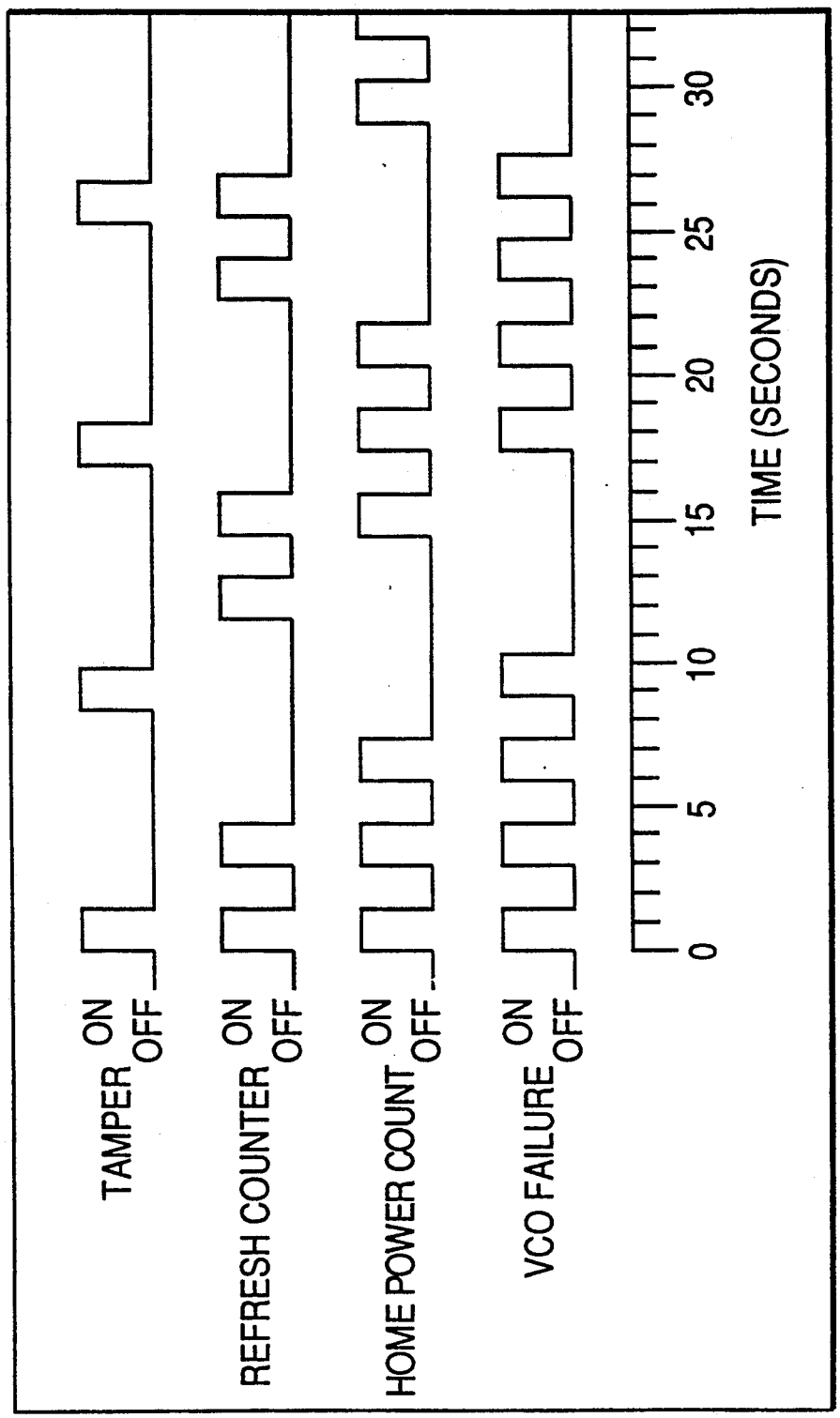
FIG. 12 is a timing diagram which depicts the series of pulses which are generated for four different diagnostic modes.

FIG. 12 depicts a timing diagram corresponding to the number of such video pulses which are provided for each of the diagnostic modes according to a preferred embodiment of the present invention. As this Figure reveals, when the tamper diagnostic mode is entered, one (1) video pulse is generated between the relatively long period during which the video signal is disabled from being provided to the subscriber. Likewise, two (2) video pulses are generated for the refresh counter diagnostic mode, three video pulses are generated for the home power count exceeded diagnostic mode, and four video pulses are generated for the VCO failure diagnostic mode. The "on" and "off" references in FIG. 12 indicate when the video is turned on and off, respectively, and the time at the bottom of the diagram indicates at which point in time the video is turned on and off for each diagnostic mode.

Referring back to FIG. 10, step 1007 therefore corresponds to the tamper diagnostic mode, where the video is pulsed one time between relatively long periods during which the video is disabled. Similarly, step 1011 corresponds to the refresh diagnostic mode, where the video is pulsed two times; step 1015 corresponds to the VCO failure diagnostic mode where the video is pulsed four times; and step 1019 corresponds to the home power count exceeded diagnostic mode, where the video is pulses three times.

The disabling and pulsing of the video, as shown in steps 1007, 1011, 1015 and 1019 and depicted in FIG. 12, is performed by microprocessor 560 and/or 600. Both microprocessors are used because two of the diagnostic modes affect all of the subscriber modules shown in FIG. 6 equally, whereas two of the diagnostic modes affect each subscriber module separately. Therefore, microprocessor 560 controls microprocessor 600 in order to generate the video pulses accordingly.

Specifically, all of the subscriber modules are affected equally for steps 1007 and 1011, which correspond to the tamper and the refresh diagnostic modes where the video is pulsed one and two times, respectively. In other words, when either the tamper or refresh diagnostic mode is entered, the video signal controlled by all of the installed subscriber modules is caused to pulse in a manner described above with respect to FIGS. 10 and 12.

In order to pulse the video for the tamper and refresh diagnostic modes, each microprocessor 600 of each subscriber module is controlled by microprocessor 560. In one embodiment, microprocessor 600 is caused to pulse the video corresponding to its subscriber module by pulsing the service denying switch 689. Referring to FIG. 12, for the tamper diagnostic mode, microprocessor 600 causes service denying switch 689 to allow the video signal to travel from the common control circuit of FIG. 5, through the subscriber module of FIG. 6, and to the subscriber television receiver. As shown in FIG. 12, this occurs from an initial time 0 for 1.5 seconds. Thereafter, microprocessor 600 causes service denying switch 689 to disable the video from passing to the subscriber television receiver. This occurs for 7 seconds, up until 8.5 seconds after the initial time 0. Thereafter, the cycle repeats. Similarly, for the refresh diagnostic mode, microprocessor 600 controls service denying switch 689 as depicted in the waveform in FIG. 12.

In contrast with the tamper and refresh diagnostic modes, the home power counter exceeded and VCO failure diagnostic modes affect each subscriber module individually. That is, because these diagnostic modes relate to a problem unique to only one subscriber module at a time, these diagnostic modes only are entered by each subscriber module if the situation warrants.

When either of these diagnostic mode occurs with respect to any of the subscriber modules, microprocessor 560 controls only the respective microprocessor 600 of the subject subscriber modules to implement the mode. The execution of these two latter diagnostic modes is therefore similar to the tamper and refresh diagnostic modes except that only the relevant subscriber modules are affected. Otherwise, the implementation of these modes occurs analogously to the implementation of the refresh and tamper diagnostic modes, except with different timing characteristics, as shown in FIG. 12. For example, as shown in the waveforms of FIG. 12, the home power count exceeded diagnostic mode causes the video of the particular subscriber module to be pulsed on and off three times during each cycle, while the VCO failure diagnostic mode causes the video signal for the particular subscriber module to be pulsed on and off four times during each cycle.

As FIG. 10 reveals, the four diagnostic modes of the present invention are prioritized so that the diagnostic mode having the highest priority is caused to be entered. Particularly, FIG. 10 shows that the end of cycle step 1021 is encountered after any one of steps 1007, 1011, 1015 or 1019 is performed. Therefore, if the tamper diagnostic mode is entered at step 1007, the remaining three diagnostic modes are ignored. Alternatively, if the refresh diagnostic mode is entered at step 1011, the remaining two diagnostic modes are ignored. If the VCO failure diagnostic mode is entered at step 1015, the last diagnostic mode is ignored. Only if none of the first three diagnostic modes is entered at steps 1007, 1011, or 1015, is the home power count exceeded diagnostic mode able to be entered at step 1019, if appropriate. This prioritizing system ensures that the diagnostic mode with the highest priority (e.g., the "most important" diagnostic mode) is entered, thus allowing the repair technician to fix the most serious problem first.

Although the use of the service denying switch 689 has been disclosed as a method of pulsing the video provided to a subscriber, other methods of pulsing the video may be implemented. For example, instead of using the service denying switch 689, the video may be pulsed by selectively jamming the signal with oscillators 641–644. Thus, an "on" pulse shown in FIG. 12 may comprise the absence of jamming by oscillators 641–644, while an "off" pulse may comprise the jamming of the video signal, or vice versa. Of course, other methods may be used to implement the pulsing of the video, including the combination of the above methods.

While only four diagnostic modes have been disclosed in a preferred embodiment, the principles discussed above may easily be applied to other diagnostic modes corresponding to other situations which a remote unit may encounter. Accordingly, additional diagnostic modes may affect only one module of the system, or multiple modules of the system, and may of course be applied to systems other than cable television interdiction units.

In operation, the diagnostic modes of the present invention may be utilized as follows: When the end user, such as a subscriber, sees the pulsing of the video on his/her television receiver, the subscriber will contact the cable operator, or other operator of the communication system, and report the problem. The subscriber will presumably not need to know to what problem the video pulsing corresponds, but only how many pulses he or she is seeing on the television receiver. The cable operator representative will inquire into how many pulses are being observed, and from this information, the problem with the interdiction unit can be determined. Based upon this information, a technician may be dispatched to the site of the interdiction unit with the appropriate tools and knowledge necessary to correct the problem. If a technician is not able to be dispatched to the site, an addressed transaction may be transmitted to the remote unit to override the diagnostic mode.

As discussed previously, in addition to the pulsing of video signals, the diagnostic modes of the present invention may be implemented in other ways as well. For example, according to one embodiment, LED 450 on the tamper override module (TOM) (FIG. 4) may be caused to flash at a rate consistent with the pulses shown in FIG. 12 under control of microprocessor 560. Thus, when the TOM is inserted into the remote unit, the LED 450 will flash according to the particular diagnostic mode which has been entered, if any. If no diagnostic mode has been entered, the LED 450 either will not flash or will be activated for other purposes, as discussed above.

In another embodiment, an LED (not shown) may be located on each subscriber module of the present invention (FIG. 6), and may flash at a rate consistent with the waveform of FIG. 12, depending on the diagnostic mode, if any. In this way, if the home power count exceeded or VCO failure diagnostic mode is entered, which affects each subscriber module independently, it may be determined which subscriber module this diagnostic mode is related to. This type of indication of a diagnostic mode may be controlled by microprocessor 560.

A number of applications for U.S. patents and issued patents have been identified above with respect to the subject matter of the present invention. All such references to these applications and patents shall be deemed to incorporate any subject matter essential to the description of the present invention.

While the principles of the present invention have been described above in conjunction with specific apparatus, it is to be understood that this description is made only by way of example and not as a limitation to the scope of the invention.

We claim:

1. In a television communication system including a headend for transmitting a broadband television signal and a remote unit coupled to said headend for receiving the broadband television signal from said headend through a communication link, a method for operating said remote unit comprising the steps of:
   (a) detecting at least one error condition associated with said remote unit;
   (b) encoding a television signal responsive to the detection of at least one error condition; and
   (c) outputting the encoded television signal for display on a television receiver.

2. The method according to claim 1, wherein said step of encoding comprises the steps of alternately connecting and disconnecting the television signal to an output terminal of said remote unit 3. The method according to claim 1, wherein each error condition has a predetermined number associated therewithin and said step of encoding further comprises the steps of:
   (i) disconnecting the television signal from an output terminal of said remote unit during a first time period, and
   (ii) alternately connecting the television signal to and disconnecting the television signal from said output terminal during a second time period thereby applying a pulsed television signal having a number of pulses to said output terminal, wherein the number of of pulses in the pulsed television signal corresponds to the predetermined number associated with the detected at least one error condition.

4. The method according to claim 3, wherein said first time period is 7 seconds in length.

5. The method according to claim 3, wherein said step of alternately connecting and disconnecting comprises the steps of:
   connecting the television signal to said output terminal for approximately 1.5 seconds, and
   disconnecting the television signal from said output terminal for approximately 1.5 seconds.

6. The method according to claim 3, wherein said plurality of error conditions includes a tamper condition indicative of unauthorized tampering with said remote unit.

7. The method according to claim 3, wherein said plurality of error conditions includes a refresh timer timeout condition indicative of a failure of communication between said headed and said remote unit.

8. The method according to claim 3, wherein said plurality of error conditions includes a home power count exceeded condition indicating that power supplied to the remote unit has been removed and restored more than a predetermined number of occasions.

9. The method according to claim 3, wherein said plurality of error conditions includes a voltage controlled oscillator failure condition.

10. The method according to claim 1, wherein said plurality of error conditions includes a tamper condition indicative of unauthorized tampering with said remote unit, a refresh timer timeout condition indicative of a failure of communication between said headend and said remote unit, a home power count exceeded condition indicating that power supplied to the remote unit has been removed and restored more than a predetermined number of occasions, and a voltage controlled oscillator failure condition.

11. The method according to claim 10, wherein the tamper condition has a higher priority than the refresh time timeout condition, the voltage controlled oscillator failure condition, and the home power count exceeded condition.

12. The method according to claim 10, wherein the refresh time timeout condition has a higher priority than the voltage controlled oscillator failure condition and the home power count exceeded condition.

13. The method according to claim 10, wherein the voltage controlled oscillator failure condition has a higher priority than the home power count exceeded condition.

14. The method according to claim 1, wherein said remote unit comprises an interdiction unit.

15. The method according to claim 1, wherein said communication link comprises a cable television distribution system.

16. In a television communication system including a headend for broadcasting a broadband television signal and a remote unit coupled to said headend for receiving the broadband television signal from said headend through a communication link and for outputting a television signal for display on a television signal receiving apparatus, a method for operating said remote unit comprising the steps of:
   (a) detecting at least one of a plurality of error conditions associated with said remote unit, each error condition having a predetermined number associated therewith;
   (b) controlling a light-emitting device coupled to said remote unit to be OFF during a first time period responsive to the detection of at least one error condition; and
   (c) pulsing said light-emitting device ON and OFF a number of times during a second time period responsive to the detection of at least one error condition, wherein the number of times said light-emitting device is pulsed ON and OFF corresponds to the predetermined number associated with the detected at least one error condition.

17. The method according to claim 16, wherein said light-emitting device comprises a light emitting diode (LED).

18. A remote unit adapted for use in a television communication system comprising:
   an input terminal for receiving a broadband television signal from a headend through a communication link;
   a detector for detecting at least one error condition associated with said remote unit;
   encoding means coupled to said input terminal and said detector for encoding a television signal in response to a detection of at least one detected error condition by said detector; and
   an output terminal coupled to said encoding means for outputting the encoded television signal for display on a television receiving receiver.

19. The remote unit according to claim 18, wherein a plurality of error conditions are associated with said remote unit, and said detector comprises detecting means for detecting at least one of said plurality of error conditions.

20. The remote unit according to claim 18, wherein each error condition has a predetermined number associated therewith and said encoding means comprises:
   means for disconnecting said television signal from said output terminal during a first time period, and
   means for alternately connecting the television signal to and disconnecting the television signal from said output terminal a number of times during a second time period thereby applying a pulsed television signal having a number of pulses to said output terminal, wherein the number of times said television signal is pulsed corresponds to the predetermined number associated with the at least one error condition detected by said detector.

21. The remote unit according to claim 20, wherein said disconnecting means and said means for alternately connecting and disconnecting alternately perform their respective functions.

22. The remote unit according to claim 20, wherein said first time period is 7 seconds in length.

23. The remote unit according to claim 20, wherein said plurality of error conditions includes a tamper condition indicative of unauthorized tampering with said remote unit.

24. The remote unit according to claim 20, wherein said plurality of error conditions includes a refresh timer timeout condition indicative of a failure of communication between said headend and said remote unit.

25. The remote unit according to claim 20, wherein said plurality of error conditions includes a home power count exceeded condition indicating that power supplied to the remote unit has been removed and restored more than a predetermined number of occasions.

26. The remote unit according to claim 20, wherein said plurality of error conditions includes a voltage controlled oscillator failure condition.

27. The remote unit according to claim 24, wherein said plurality of error conditions includes a tamper condition indicative of unauthorized tampering with said remote unit, a refresh timer timeout condition indicative of a failure of communication between said headend and said remote unit, a home power count exceeded condition indicating that power supplied to the remote unit has been removed and restored more than a predetermined number of occasions, and a voltage controlled oscillator failure condition.

28. The remote unit according to claim 27, wherein the tamper condition has a higher priority than the the refresh time timeout condition, the voltage controlled oscillator failure condition, and the home power count exceeded condition.

29. The remote unit according to claim 27, wherein the refresh time timeout condition has a higher priority than the voltage controlled oscillator failure condition and the home power count exceeded condition.

30. The remote unit according to claim 27, wherein the voltage controlled oscillator failure condition has a higher priority than the home power count exceeded condition.

31. The remote unit according to claim 18, wherein said remote unit is an interdiction unit.

32. The remote unit according to claim 18, wherein said communication link comprises a cable television distribution system.

33. A remote unit adapted for use with a television communication system including a headend for broadcasting a television signal to said remote unit through a communication link, said remote unit also adapted for outputting a television signal for display on a television signal receiving apparatus, said remote unit comprising:
   a detector for detecting at least one of a plurality of error conditions associated with said remote unit, each error condition having to a predetermined number associated therewith;
   means for controlling a light-emitting device coupled to said remote unit to be OFF during a first time period responsive to the detection of at least one error condition by said detector; and
   means for pulsing said light-emitting device ON and OFF a number of times during a second time period, wherein the number of times said light-emitting device is pulsed ON and OFF corresponds to the predetermined number associated with the at least one detected error condition detected by said detector.

34. The remote unit according to claim 33, wherein said light-emitting device comprises a light emitting diode (LED).

35. The method according to claim 1, wherein the remote unit has a plurality of error conditions associated therewith, and said step of detecting comprises detecting at least one of said plurality of the error conditions.

36. The method according to claim 35, wherein each error condition corresponds to a predetermined code, and wherein said step of encoding further comprises encoding the television signal according to a predetermined code corresponding to the detected at least one error condition.

37. The method according to claim 36, wherein each error condition has a predetermined priority, and said step of encoding comprises encoding the television signal according to a predetermined code corresponding to a detected error condition having a highest predetermined priority.

38. The method according to claim 37, wherein said remote unit is an interdiction apparatus located remote from said television signal receiving apparatus.

39. The remote unit according to claim 19, wherein each error condition corresponds to a predetermined code, and wherein said encoding means encodes the television signal according to a predetermined code corresponding to the at least one detected error condition.

40. The remote unit according to claim 39, wherein each error condition has a predetermined priority, and wherein said encoding means encodes the television signal according to a predetermined code corresponding to a detected error condition having a highest predetermined priority.

41. The remote unit according to claim 18, wherein said encoding means comprises a switching circuit for alternately connecting and disconnecting the television signal to said output terminal.

* * * * *